United States Patent [19]
Mikami et al.

[11] Patent Number: 5,677,760
[45] Date of Patent: Oct. 14, 1997

[54] RANGEFINDING DEVICE FOR USE IN A CAMERA

[75] Inventors: Kazuo Mikami; Takashi Inoue, both of Tokyo, Japan

[73] Assignee: Olympus Optical Co., Ltd., Tokyo, Japan

[21] Appl. No.: 513,432

[22] Filed: Aug. 10, 1995

[30] Foreign Application Priority Data

Aug. 23, 1994 [JP] Japan ........................... 6-198824

[51] Int. Cl.⁶ .................... G01C 3/00; G03B 3/00
[52] U.S. Cl. ............... 356/3.04; 356/3.06; 356/3.07; 396/50; 396/106
[58] Field of Search .................. 356/3.01–3.15; 396/50, 106, 110, 120, 121, 116–118

[56] References Cited

U.S. PATENT DOCUMENTS

| | | |
|---|---|---|
| 4,710,011 | 12/1987 | Ushiro . |
| 5,122,827 | 6/1992 | Saegusa et al. . |
| 5,239,333 | 8/1993 | Takagi . |
| 5,434,639 | 7/1995 | Kusaka . |
| 5,499,074 | 3/1996 | Ohsawa et al. . |

FOREIGN PATENT DOCUMENTS

| | | |
|---|---|---|
| 1-222235 | 9/1989 | Japan . |
| 1-222236 | 9/1989 | Japan . |
| 6-148514 | 5/1994 | Japan . |

*Primary Examiner*—Stephen C. Buczinski
*Attorney, Agent, or Firm*—Louis Weinstein

[57] ABSTRACT

A rangefinding device for use in a camera comprising a projection section for projecting a light beam emitted by a light source through a projection lens to an object, a light pickup section disposed diagonally opposite from the projection section that picks up, on its light pickup element, light reflected off the object, two-dimensionally senses the light, and outputs incident light position information, a CPU for computing the range to the object based on the output of the light pickup section and an attitude sensor section for sensing the orientation or attitude of the camera. In response to the output of the attitude sensor section, the CPU computes the range to the object based on the incident light position information in either the vertical direction or horizontal direction of the photographing frame, output by the light pickup section.

27 Claims, 14 Drawing Sheets

RANGEFINDING DEVICE FOR USE IN A CAMERA

BACKGROUND OF THE INVENTION

1. Field of the Invention

The present invention relates to a rangefinding device for use in a camera, and, more specifically, to a camera rangefinding device that finds a range to an object by projecting a light beam to the object and then picking up light reflected off the object.

2. Related Art Statement

A so-called active rangefinding device has been well known and in widespread use. The active rangefinding device projects a light beam from a light source to an object, picks up light reflected off the object and then determines the range from the light pickup position to the object.

Such a rangefinding device can result in an erroneous range measurement if only a part of a projected light beam in the base-line direction strikes the object, namely if a spot missing takes place.

To resolve this problem, Japanese Patent Application Laid-open No. Hei-1-222235 has proposed a technique of preventing erroneous range measurement by the use of two light pickup means.

If the two light pickup sections as light pickup means are used as disclosed in Japanese Patent Application No. Hei-1-222235, however, the design of the device becomes bulky, imposing otherwise unnecessary limitations in the layout of the host camera, and consequently increasing the component count and cost.

The above active rangefinding device measures range in only parts of a photographing frame, namely, a blank area takes place.

To resolve this problem, a multi AF (auto focusing) technique is known in which a plurality of light emission elements are provided to perform range measurements in a plurality of directions. For example, Japanese Patent Application Laid-open No. Hei-1-222236 has proposed a technique in which rangefinding is performed within an appropriate range, regardless of whether a picture is taken in portrait or vertical, or landscape or horizontal orientation, by switching from one element to another for emission according to the attitude or orientation of the camera.

In the above cited Patent Application No. Hei-1-222236, however, the number of light emitting elements as light projection means is determined by the number of points of range measurements. As the number of measurement points increases, the cost of the device increases. A proper layout of light emitting elements will not be practicable for range measurements in a plurality of closely positioned points.

OBJECTS AND SUMMARY OF THE INVENTION

It is a first object of the present invention to provide a camera rangefinding device which prevents erroneous range measurement.

It is a second object of the present invention to provide a camera rangefinding device which prevents an erroneous range measurement arising from spot missing.

It is a third object of the present invention to provide a camera rangefinding device which prevents an erroneous range measurement arising from blank area.

It is a fourth object of the present invention to provide a camera rangefinding device which prevents an erroneous range measurement arising from spot missing, without increasing light pickup means.

It is a fifth object of the present invention to provide a camera rangefinding device which prevents an erroneous range measurement arising from blank area, without increasing light projection means.

It is a sixth object of the present invention to provide a camera rangefinding device which indicates to a photographer a possibility of an erroneous range measurement.

It is a seventh object of the present invention to provide a camera rangefinding device which prevents photographing from taking place without completion of rangefinding.

It is an eighth object of the present invention to provide a camera rangefinding device which permits a properly focused picture to be taken.

It is a ninth object of the present invention to provide a camera rangefinding device which permits a proper rangefinding, matching to the desired orientation setting of a picture.

The rangefinding device for use in a camera of the present invention comprises light projection means for projecting a light beam to an object, light pickup means disposed diagonally across a photographing frame opposite the light projection means, for two-dimensionally picking up light reflected off the object and for outputting positional information picked up, attitude sensor means for sensing the attitude of the camera, and computing means for computing the range to the object based on the positional information, at least either substantially vertical direction information or substantially horizontal direction information with respect to the photographing frame, contained in the output from the light pickup means, in response to the output from the attitude sensor means.

These as well as other objects and advantages of the present invention will become further apparent from the following detailed explanation.

DETAILED DESCRIPTION OF THE PREFERRED EMBODIMENTS

Figure 1:
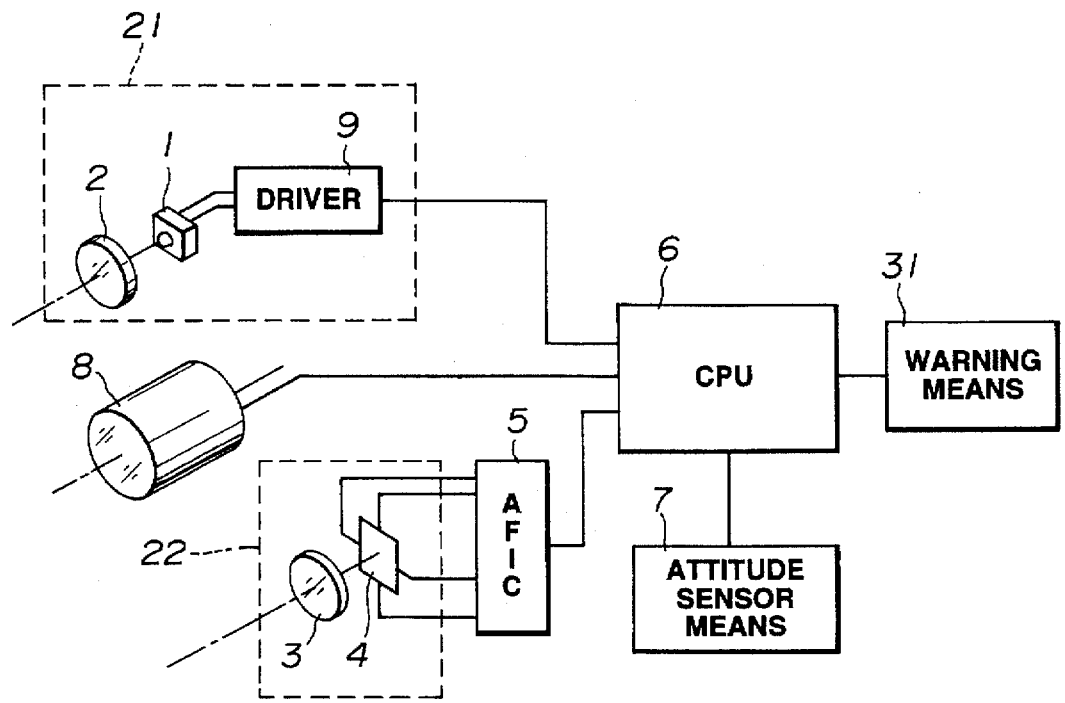
FIG. 1 is a block diagram showing the rangefinding device of a camera according to a first embodiment of the present invention.

Referring now to the drawings, the embodiments of the present invention are discussed.

Figure 2:
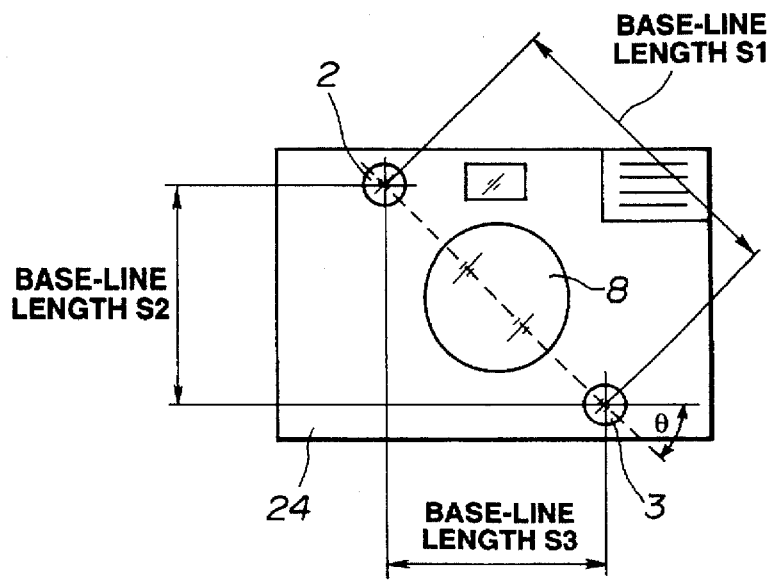
FIG. 2 is a front view of the camera, showing the positional relationship between the projection lens and light taking lens in the rangefinding device according to the first embodiment.

FIGS. 1 through 5 show the first embodiment of the present invention. FIG. 1 is a block diagram showing the constitution of the rangefinding device for use in a camera. FIG. 2 is the front view of the camera, showing the positional relationship between the projection lens and light taking lens.

As shown in FIG. 1, the rangefinding device of the camera is provided with an infrared light emitting diode (hereinafter referred to as IRED) 1 as a light source that projects a ranging light beam to an object. The light emission by IRED 1 is controlled by a driver 9.

Light emitted by IRED 1 is converged by a projection lens 2 and then projected to the object as the ranging light beam. Projection means 21 is made up of the above IRED 1, the projection lens 2 and the driver 9.

In response to the ranging light beam, the object reflects light, which passes through a light taking lens 3 and then is focused on a light pickup element 4. The light taking lens 3 and the light pickup element 4 constitute light pickup means 22.

As shown in FIG. 2, the projection lens 2 is mounted on the top left corner of the camera 24. Disposed diagonally opposite across a photographing lens 8 opposite, namely on the bottom right corner of the camera 24, is the light taking lens 3.

As shown in FIG. 2, the projection lens 2 and the light taking lens 3 are spaced apart by a base-line length S1, the direction of which is angled at θ with respect to the horizontal (X axis) of the camera 24. Namely, the projection means 21 comprising the projection lens 2 as its constituting member and the light pickup means 22 comprising the light taking lens 3 as its constituting member are arranged along the base line S1 inclined at an angle of θ with respect to the horizontal of the camera 24.

The vertical separation along the Y axis (refer also to FIG. 4) of the camera between the projection lens 2 and the light pickup lens 3 is a base-line length S2, and the horizontal separation along the X axis is a base-line length S3.

Returning to FIG. 1, the light pickup element 4 is a photoelectric conversion element that two-dimensionally picks up an incident light position of a ranging light beam reflected back. For example, the light pickup element 4 is constructed of a semiconductor light position sensor element for two-dimensional position sensing, and is mounted to sense an incident light position with respect to the horizontal direction (X axis) and vertical direction (Y axis) of the camera 24 and to output a photoelectrically converted signal in response to the incident light position.

An auto focusing integrated circuit (hereinafter referred to as AFIC) 5 computes the incident light position of the reflected light with respect to two directions, the horizontal direction (X axis) and vertical direction (Y axis) of the camera, based on the output from the light pickup element 4. The incident light position signal from AFIC 5 is fed to CPU 6 employed as computing means.

The rangefinding device of the camera is also provided with attitude sensor means 7 for sensing the attitude of the camera 24. The output of the attitude sensor means 7 is fed to CPU 6.

CPU 6 is a computing and control circuit constructed of a single-chip microcomputer that controls the entire operational sequence of the camera. CPU 6 computes the range to the object based on the incident light position signal from AFIC 5 and the output from the attitude sensor means 7, and performs focusing on the photographing lens 8 according the resulting range.

Connected to CPU 6 is warning means 31 which alerts the photographer according to the output from CPU 6 when the warning means 31 detects a possibility of an erroneous range measurement.

In the photographing frame of the camera 24, the horizontal direction or X axis is the long side of the frame and the vertical direction or Y axis is the short side of the frame.

Figure 3:
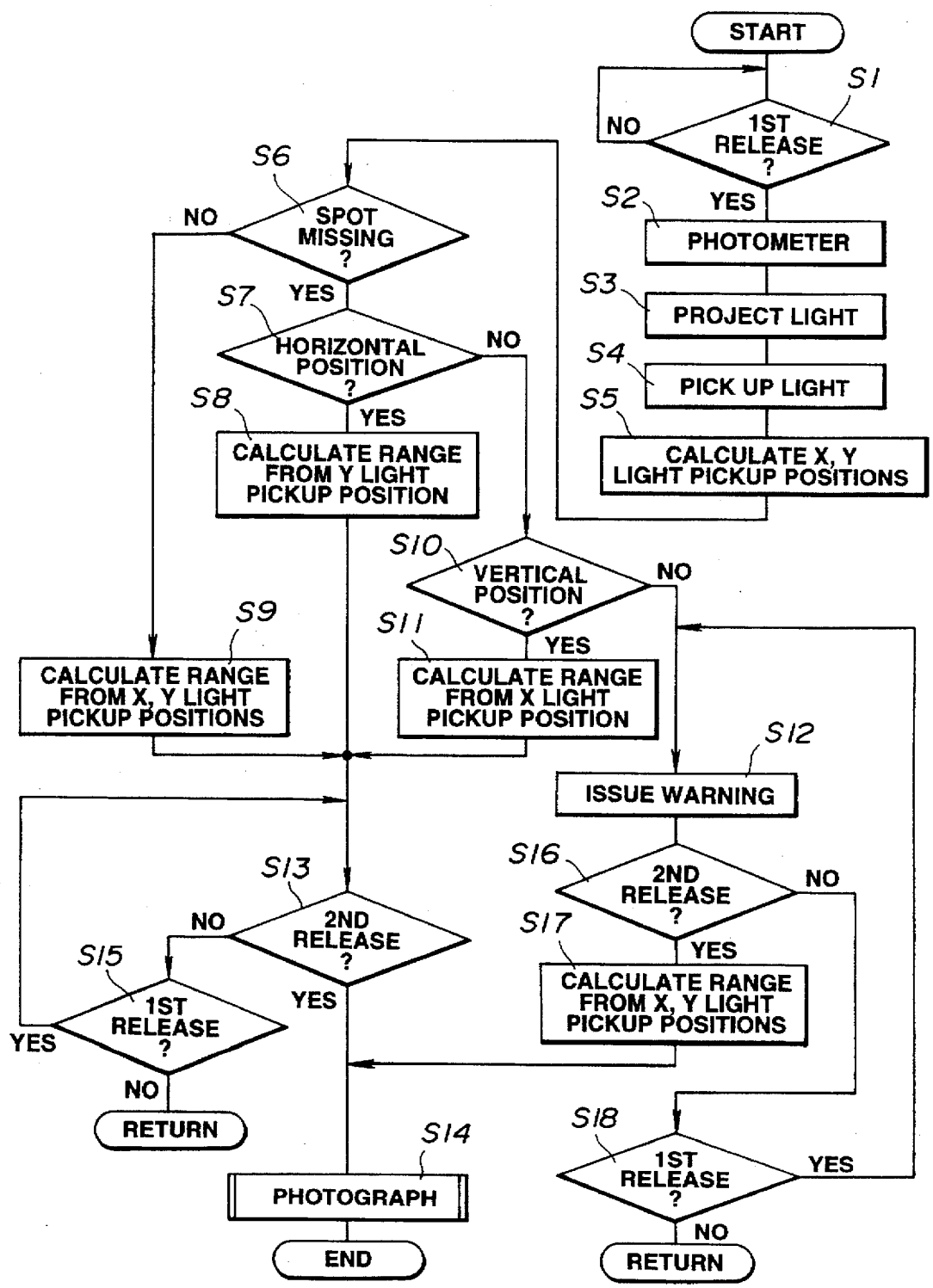
FIG. 3 is a flow diagram showing the operation of the camera of the first embodiment.

Referring now to FIG. 3, the operation of the first embodiment is discussed.

The camera 24 has an unshown release button with two-step switching capability. When a first-step pressing is applied to the release button, namely, the pressing of the release switch is detected (step S1), the light brightness level of the object is measured by unshown photometering means. Based on the measurement result, CPU 6 determines an aperture value and opening time of an unshown shutter mechanism for the photographing lens 8 (step S2).

The driver 9 allows IRED 1 to emit and project a ranging light to the object (step S3), and the light pickup element 4 receives light reflected off the object (step S4).

A signal from the light pickup element 4 is input to AFIC 5, which computes the incident light position of reflected light with respect to the horizontal direction (X axis) and vertical direction (Y axis) of the camera, as the incident light position signal, which is then fed to CPU 6 (step S5).

In response to the incident light position signal, CPU 6 determines whether spot missing takes place or not (step S6).

When the determination reveals that no spot missing takes place at step S6, CPU 6 computes the range to the object from the X and Y axis, incident light position signal given at step S5 assuming that the base-line length is S1 (step S9), and then proceeds to step S13.

When the determination reveals that a spot missing takes place at step S6, CPU 6 determines whether the camera orientation is horizontal or not, based on the output from the attitude sensor means 7 (step S7).

When the camera orientation is horizontal, CPU 6 computes the range to the object based on the Y axis, incident light position signal determined at step S5 (step S8) assuming that the base-line length is S2, and then proceeds to step S13.

When the camera orientation is not horizontal at step S7, CPU 6 determines whether or not the camera orientation is vertical (step S10), based on the output from the attitude sensor means 7.

Determination of whether the camera orientation is horizontal or vertical is made referring to whether the camera is inclined with respect to the horizontal about the optical axis of the photographing lens 8. In this embodiment, when the camera is within an inclination range of 0°±10°, the camera is judged to be horizontal in its orientation. When the camera is within an inclination range of 90°±10°, the camera is judged to be vertical in its orientation.

When the camera is found to be vertical at step S10, CPU 6 computes the range to the object based on the X axis, incident light position signal determined at step S5 (step S11) assuming that the base-line length is S3, and then proceeds to step S13.

When the camera is not vertical at step S10, the warning means 31 issues a warning to the photographer (step S12).

When a second-step pressing is applied to the release button, namely, the pressing of a second release switch is detected (S16), CPU 6 computes the range to the object from the X, Y incident light positions determined at step S5 (S17) and then proceeds to step S14.

When the second-step pressing of the release button is not detected at step S16, the first-step pressing of the release button is checked again (step S18). When the first-step pressing has taken place, the sequence returns to step 12. When the first-step pressing has not taken place, the sequence returns to step 1.

When step 8, step 9 or step 11 ends, the second-step pressing of the release button is detected (step S13). Given no detection of the second-step pressing, the first-step pressing of the release button is again checked (step S15). With the first-step pressing of the release button detected, the sequence returns to step S13. With the first-step pressing undetected, the sequence returns to step S1.

When the second-step pressing of the release button is detected at step S13, CPU 6 performs focusing to the photographing lens 8 based on the resulting range information to the object, photographs by controlling the opening of the unshown shutter mechanism according to the shutter opening time and aperture value, positions the photographing lens 8 back to its initial position (step S14) to end this sequence.

When the camera is neither horizontal nor vertical, the warning is issued at step S12 in order to notify the photographer of the possibility of an erroneous range measurement which is probably due to the spot missing and further in order to prompt him to perform range measurement again with the camera orientation altered.

When the second-step pressing of the release button is detected at step S16, photographing is performed after the range to the object is computed from the X, Y incident light positions. This helps the photographer photograph without missing photo opportunities.

In this case, a well-focused picture will be taken with the depth of field increased if photographing is performed with an unshown aperture mechanism for the photographing lens 8 set to be smaller.

It is also contemplated that, when the second-step pressing is detected at step S15, a warning is issued while the release button being locked to disable photographing to prevent out-of-focus pictures from being taken.

Discussed next is the method of determining whether a spot missing takes place or not and the method of computing the range to the object in steps S8, S9, S11 and other steps.

Figure 4:
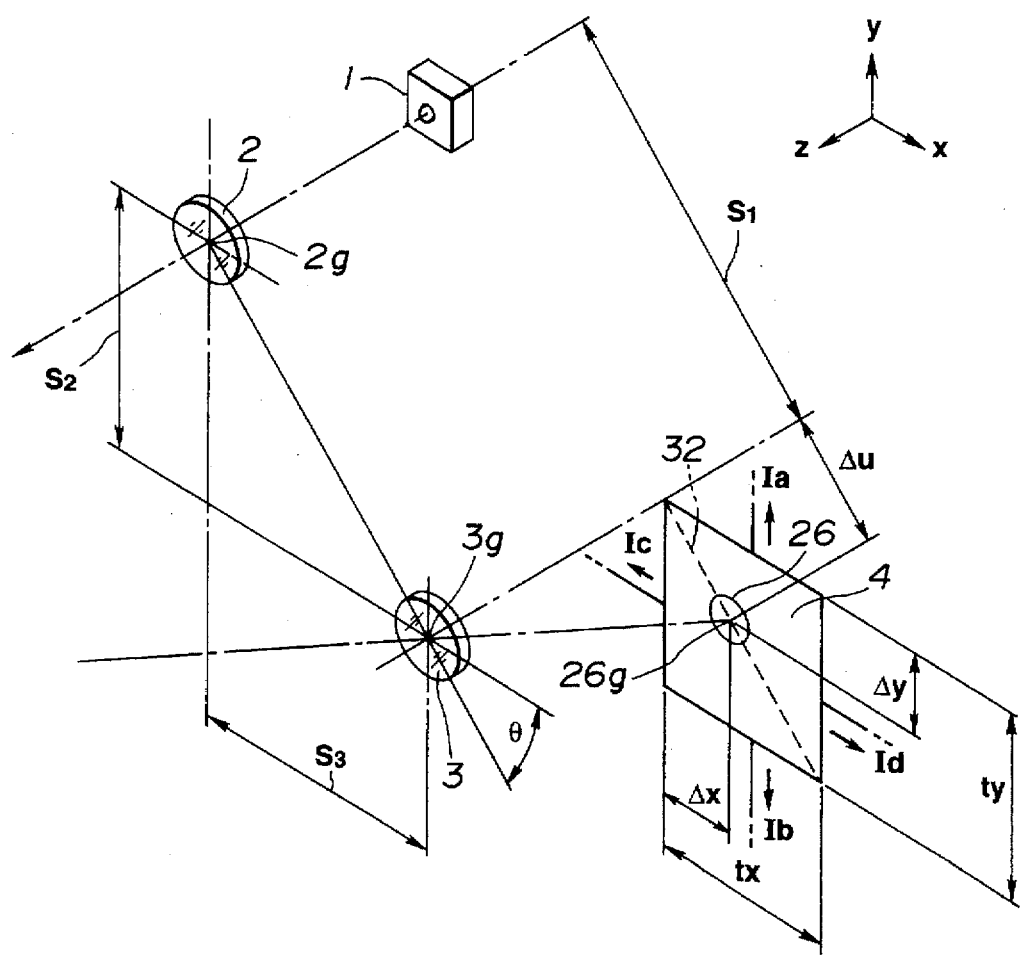
FIG. 4 is a perspective view showing the essential portion of the rangefinding device for use in a camera according to the first embodiment.

FIG. 4 is the perspective view showing the essential portion of the rangefinding device of the first embodiment. As shown, the axes are referenced to the horizontal and vertical axes of the camera 24, namely, the X axis corresponds to the horizontal direction of the camera 24, the Y axis corresponds to the vertical direction of the camera 24, and the Z axis corresponds to the direction of the thickness of the camera 24.

Light emitted by IRED 1 is projected to the object via the projection lens 2, and then reflected light from the object is transmitted through the light taking lens 3 and then focused on the light pickup element 4 forming a incident light image 26.

The base-line length S1 is a line segment drawn between the principal point 2g of the projection lens 2 and the principal point 3g of the light taking lens 3. The elevation angle at which one at the principal point 3g of the light taking lens looks up the principal point 2g of the projection lens 2 is θ. The separation along the X axis between the principal point 2g of the projection lens 2 and the principal point 3g of the light taking lens 3 is the base-line length S3, and the separation along the Y axis is the base-line length S2.

The dimensions of the light pickup element 4 along X and Y axes are respectively tx, ty, and the center of the incident light image 26 on the light pickup element 4 is 26g.

Δu is the length in parallel with the base-line S1 between the center 26g of the incident light image 26 and the point where the light pickup element 4 intersects the optical axis of the light taking lens 3. Distances in X and Y axes between the intersection and the center 26g are Δx and Δy.

When no spot missing takes place, the center 26g of the incident light image 26 of the reflected light is on a line lying in the light pickup element 4, namely on a reference line 32 intersecting the optical axis of the light taking lens 3 and being in parallel with the base-line length S1 drawn between the principal point 2g of the projection lens 2 and the principal lens 3g of the light taking lens 3.

The determination of the presence or absence of spot missing is determined according to whether or not the incident light position signal output at step S4 is on the reference line 32. When the incident light position is not on the reference line 32, the spot missing is considered to take place. When the incident light position is on the reference line 32, no spot missing is considered to take place. The determination on spot missing is thus made.

Next, the range to the object is computed. First, the position of the center 26g of the incident light image 26 on the light pickup element 4, namely Δx, Δy, Δu, is determined from photoelectrically converted signals Ia, Ib, Ic and Id output by the light pickup element 4. Based on these, the range to the object is computed according to the principle of triangulation.

Δx, Δy are related with currents Ia, Ib, Ic and Id as follows:

$$\Delta x = tx \cdot Id/(Ic+Id) \quad (1)$$

$$\Delta y = tx \cdot Ib/(Ia+Ib) \quad (2)$$

The position of the center 26g in the Y axis direction is thus computed from currents Ic and Id, and the position of the center 26g in the X axis direction is computed from currents Ic and Id.

As seen from FIG. 4, Δu is expressed according to the Pythagorean theorem as follows:

$$\Delta u = \sqrt{(\Delta x^2 + \Delta y^2)} \quad (3)$$

The range to the object may be expressed based on the principle of triangulation as follows:

Range to object=(Focal length of light taking lens)×(Base-line length)/(Center of incident light image)   (4)

Figure 5:
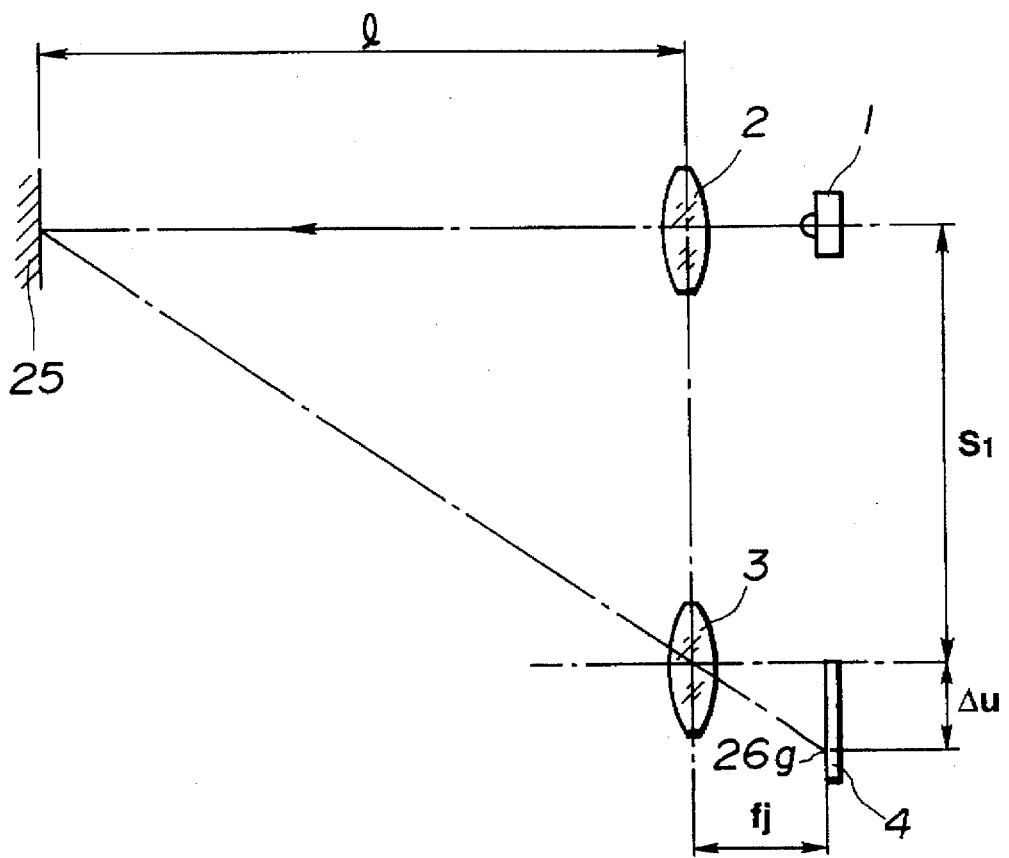
FIG. 5 is a side view showing the essential portion of the rangefinding device for use in a camera of FIG. 4.

FIG. 5 illustrates the relationship between the range 1 to the object 25 and the center 26g of the incident light image assuming that the base-line length is S1. fj designates the focal length of the light taking lens 3. As seen from FIG. 5, the range 1 to the object is expressed from the equation (4) as follows:

$$l = fj \cdot S1/\Delta u \quad (5)$$

Equations to derive the range 1 to the object for the base-line lengths S2 and S3 are expressed in the same manner as follows:

$$l = fj \cdot S2/\Delta y \quad (6)$$

$$l = fj \cdot S3/\Delta x \quad (7)$$

According to any of S1, S2, and S3 as the base-line length, the range 1 to the object can be computed.

Which one to use in the determination of the range to the object is based on the following criteria.

When no spot missing takes place, the range to the object is computed on the base-line length S1. When spot missing takes place, the base-line length S2 (S3) is used to compute the range to the object when the camera is horizontally (vertically) oriented.

The base-line length is thus selected from among S1, S2 and S3, based on the presence or absence of spot missing and the camera orientation or attitude. The reason for this selection follows.

In the active range measurement, an erroneous measurement will be made if a spot missing takes place in the direction of the base-line length. However, even if a spot missing takes place in a direction perpendicular to the base line, no erroneous measurement is made. Thus, no problem in measurement will arise if the base line and the spot missing are in mutually perpendicular directions.

Now, let us analyze how likely the spot missing takes place in any particular direction. Suppose that the object is a human figure. Generally, the vertical direction is in the height of the human figure and the horizontal direction is in the width across the human figure. Considering the ratio of the height to the width in the human figure, the spot missing is more likely to take place in the horizontal than in the vertical direction.

This suggests that the erroneous measurement due to spot missing is less likely if the base line is set up in the vertical direction. When a spot missing take place, the range to the object is computed with S2 as the base-line length when the camera is horizontally oriented. The range to the object is computed with S3 as the base-line length when the camera is vertically oriented.

The reason the range to the object is computed with S1 as the base-line length when no spot missing takes place is that the base-line length S1 offers a high accuracy in range measurement compared with base-line lengths S2, S3, because S1 is longer than any of S1 and S2 as seen from FIG. 2.

As described above, according to the first embodiment of the present invention, the range to the object is computed based on the incident light position signal and the base-line length selected according to the presence or absence of spot missing and the camera orientation. Therefore, the range to the object is measured with no possibility of erroneous measurement, even if a spot missing takes place in the horizontal direction in which the occurrence of spot missing is more likely than in the vertical direction. When no spot missing takes place, the range to the object is computed on the longer base-line length to enhance the range accuracy.

FIGS. 6 through 13D show the second embodiment of the present invention. In the discussion of the second embodiment, the explanation of those components equivalent to those described with reference to the first embodiment is omitted, and the difference from the first embodiment is mainly detailed.

Figure 6:
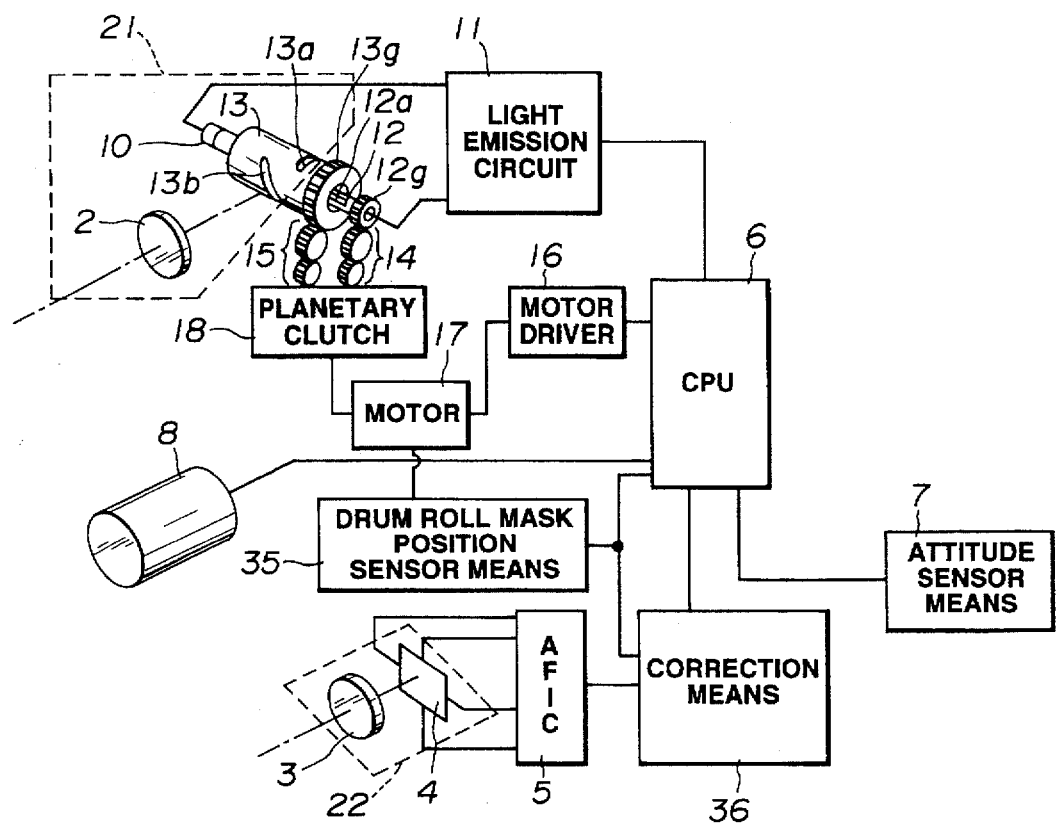
FIG. 6 is a block diagram showing the rangefinding device for use in a camera according to a second embodiment of the present invention.
Figure 7A:
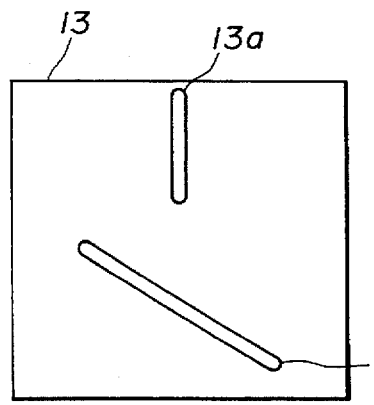
FIGS. 7A and 7B are development views showing the slits of the roll mask according to the second embodiment.
Figure 7B:
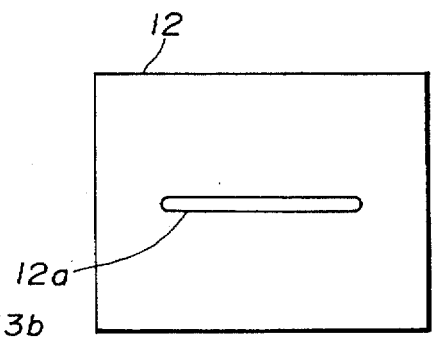

The rangefinding device in the camera of the second embodiment has a xenon lamp 10 as a light source for projecting a light beam (for rangefinding) to the object as shown in FIG. 6. The xenon lamp 10 is driven by an a light emission circuit 11.

Around the xenon lamp 10 is a drum-like roll mask 12 supported in a freely rotatable manner. The roll mask 12 is provided with a slit or window 12a as scanning means longitudinally extending along the xenon lamp 10 (refer to FIG. 7B).

Around the roll mask 12 is also a drum-like roll mask 13 supported in a freely rotatable manner. The roll mask 13 is provided with a slit or window 13a (FIG. 7A) as scanning means running straight around its circumference, and a slit or window 13b (FIG. 7A) as scanning means extending diagonally or spirally around its circumference.

Part of light from the xenon lamp 10 is projected out through openings where the slit or window 12a of the roll mask 12 and the slits 13a, 13b of the roll mask 13 meet. The projected light is converged by the projection lens 12, and then projected to the object as ranging light.

The xenon lamp 10, roll masks 12, 13 and projection lens 2 constitute light projection means 21.

Gear portions 12g, 13g, acting as a rotation transmission section are integrally attached to the ends of the roll masks 12, 13, respectively. The gear portions 12g, 13g are respectively meshed with a series of gears 14, 15 that also constitute the rotation transmission section.

The other ends of the gear series 14, 15 are meshed with a motor 17 as a driving section, via a planetary clutch 18 as scanning direction switching means. Manipulating the planetary clutch 18 switches back and forth between the roll mask 12 side and the roll mask 13 side, as the destination of transmission of the driving force of the motor 17.

The driving motor 17 is driven by CPU 6 via a motor driver 16. Its driving condition is monitored by a drum roll mask position sensor means 35.

In response to the input from the motor 17, the drum roll mask position sensor means 35 senses the positions of the roll masks 12, 13, and determines the direction of projection of ranging light projected by the projection means 21. In the second embodiment, the drum roll mask position sensor means 35 constitutes projection direction sensor means.

The sensing results of the drum roll mask position sensor means 35 is output to both CPU 6 and correction means 36 to be described later.

Ranging light projected by the projection means 21 is reflected off the object, passes through the light taking lens 3 and forms an image on the light pickup element 4. The light taking lens 3 and the light pickup element 4 constitute the light pickup means 22.

The projection means 21 and light pickup means 22 are spaced apart by the base-line length S1 in the same manner as in the first embodiment. The base-line length S1 is inclined at an angle of θ with respect to the horizontal of the camera 24.

The light pickup element 4 is a photoelectric converter element for two-dimensionally sensing the incident light position reflected off the object as it is stricken by the ranging light. As in the first embodiment, the light pickup element 4 is constructed of a semiconductor light position sensor element for two-dimensional position sensing. The light pickup element 4 is mounted to sense an incident light position with respect to the horizontal direction (X axis) and vertical direction (Y axis) of the camera 24 and to output a photoelectrically converted signal in response to the incident light position.

The output of the light pickup element 4 is input to the auto focusing integrated circuit (AFIC) 5, which in turn computes the incident light position in terms of horizontal direction (X axis) and vertical direction (Y axis) of the camera in response to the output from the light pickup element 4. AFIC 5 outputs the calculation result to the correction means 36.

The correction means 36 corrects the incident light position computed by AFIC 5 in accordance with the output from the drum roll mask position sensor means 35, and outputs its corrected result to CPU 6.

The rangefinding device of the camera is provided with the attitude sensor means 7 for sensing the orientation or attitude of the camera 24. The attitude sensor means 7 outputs its sensing result to CPU 6.

CPU 6 is the computing and control circuit constructed of a single-chip microcomputer that controls the entire operational sequence of the camera. In response to the output signal of the drum roll mask position sensor means 35, CPU 6 sends a control signal to the motor driver 16 to control the motor 17 while sending a flashing signal to the light emission circuit 11 to control the flash timing of the xenon lamp 10.

Furthermore, in response to the output of the attitude sensor means 7, CPU 6 determines the scanning direction of ranging light and controls the motor 17. CPU 6, in response to the incident light position signal of the correction means 36 and the output from the attitude sensor means 7, computes the range to the object, and performs focusing on the photographing lens 8 in response to the calculation result.

In the photographing frame of the camera 24, as in the first embodiment, the horizontal direction or X axis is the long side of the frame and the vertical direction or Y axis is the short side of the frame.

Discussed next is the mechanism that switches the scanning direction for the ranging light to be projected to the object by allowing the motor 17 to normally or reversely rotate.

Figure 9:
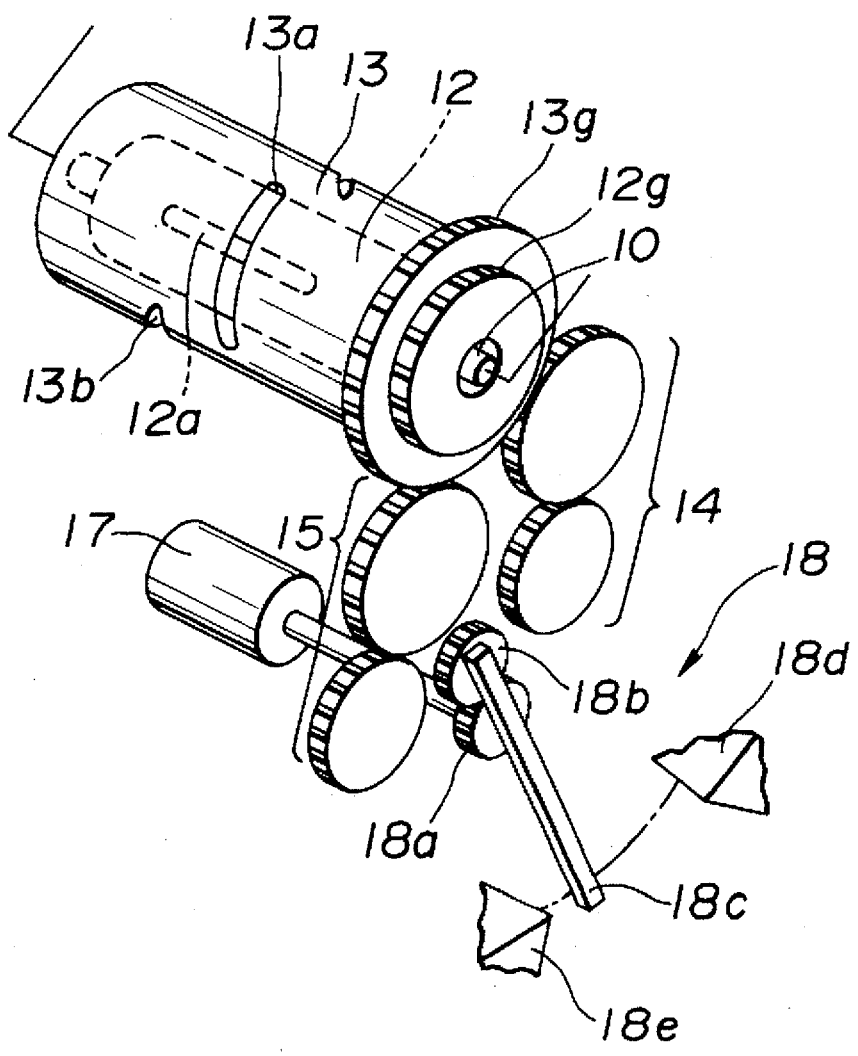
FIG. 9 is a perspective view showing the planetary clutch according to the second embodiment.

Referring to FIGS. 9 and 10A through 10C, the operation of the planetary clutch 18 is discussed. FIG. 9 is the perspective view showing the planetary clutch 18.

As shown in FIG. 9, a pinion gear 18a as the sun gear of the planetary clutch 18 is rigidly attached onto the output shaft of the motor 17 for integral rotation. The pinion gear 18a is meshed with the planetary gear 18b.

The planetary gear 18b is supported, by an unshown friction mechanism, on one end of a connecting bar 18c that is freely rotatably supported by the pinion gear 18a. When the other end of the connecting bar 18c touches a stopper 18d or 18e, the revolution of the connecting bar 18c is restricted.

Figure 10A:
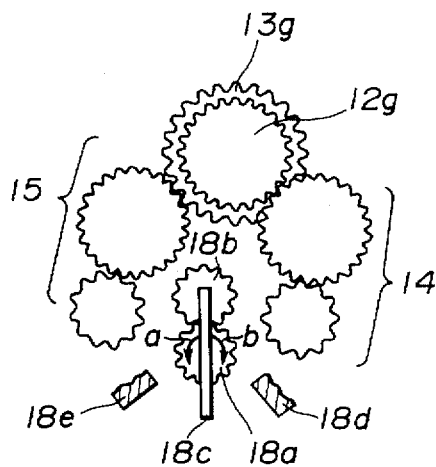
FIG. 10A is a side view showing the state in which the planetary clutch of the second embodiment is at its neutral position.
Figure 10B:
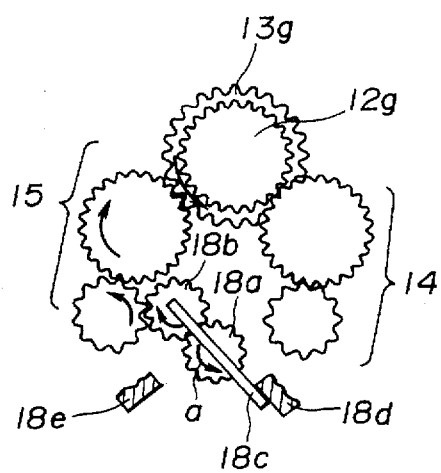
FIG. 10B is a side view showing the state in which the planetary clutch of the second embodiment transmits driving force to an outer roll mask.
Figure 10C:
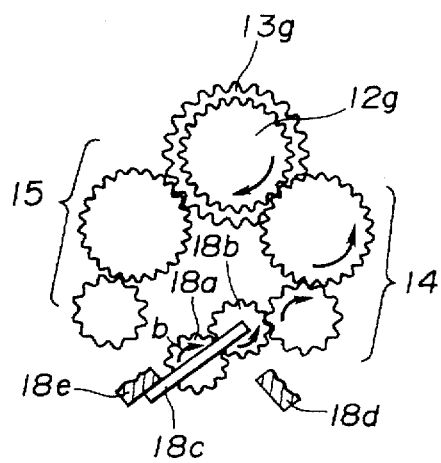
FIG. 10C is a side view showing the state in which the planetary clutch of the second embodiment transmits driving force to an inner roll mask.

The operation of the planetary clutch 18 thus constructed is now discussed referring to side views in FIGS. 10A through 10C of the planetary clutch 18.

FIG. 10A shows the neutral state, in which no scanning operation is performed with the planetary gear 18b not meshed with any of gear series 14, 15.

Now suppose that the motor 17 stats rotating in the direction of the arrow a (normal direction) in FIG. 10A. The connecting bar 18c is revolved by means of its unshown friction mechanism with the planetary gear 18b, along with the rotation of the pinion gear 18a, until the connecting bar 18c is stopped by the stopper 18d. In this case, the rotation of the pinion gear 18a is used to allow the connecting bar 18c to revolve rather than to allow the planetary gear 18b to rotate.

When the connecting bar 18c is stopped by the stopper 18d, the planetary gear 18b is meshed with the gear series 15, causing the driving force of the motor 17 to be transmitted to rotate the roll mask 13 as shown in the state in FIG. 10B.

FIG. 10B shows the state in which the ranging light scans in the direction of the long edge of the photographing frame.

When the motor 17 is rotated in the direction of the arrow b (reverse direction) in FIG. 10A, the connecting bar 18c is revolved along with the rotation of the pinion gear 18a until the connecting bar 18c is stopped by the stopper 18e as shown in the state in FIG. 10C.

The planetary gear 18b is meshed with the gear series 14, causing the driving force of the motor 17 to be transmitted to rotate the roll mask 12.

FIG. 10C shows the state in which the ranging light scans in the direction of the short edge of the photographing frame.

Discussed next is how the scanning direction of the ranging light varies depending on the rotation of the roll masks 12, 13.

In FIGS. 11A through 11F, right-hand diagrams show the positional relationship between the roll mask 12 and roll mask 13, viewed in front of the camera 24. Left-hand diagrams show the corresponding relationship between the area of coverage of photographing 34 and light image 33, viewed from the camera 24 side.

The coordinates are those viewed in front of the camera 24, with the X axis agreeing with the horizontal direction of the camera 24 and the Y axis agreeing with the vertical direction of the camera 24.

Figure 11A:
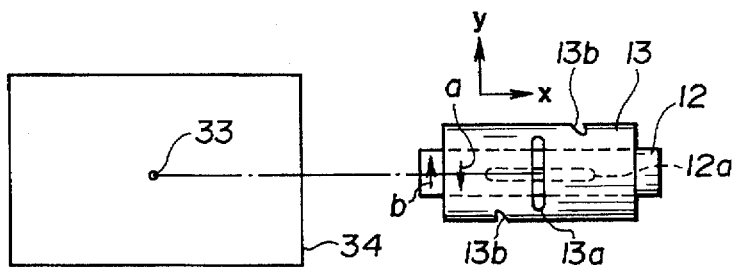
FIGS. 11A through 11F show the relationship between the position of roll mask and the projected light image within an area of coverage of photographing in the above second embodiment.
Figure 11B:
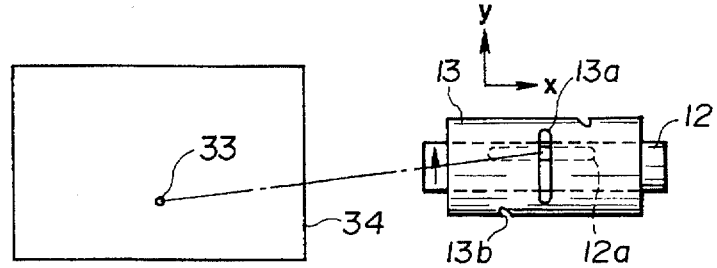
Figure 11C:
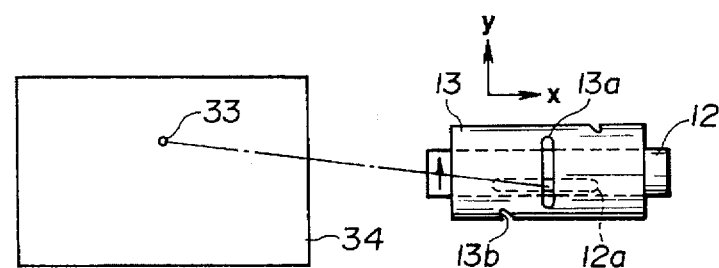
Figure 11D:
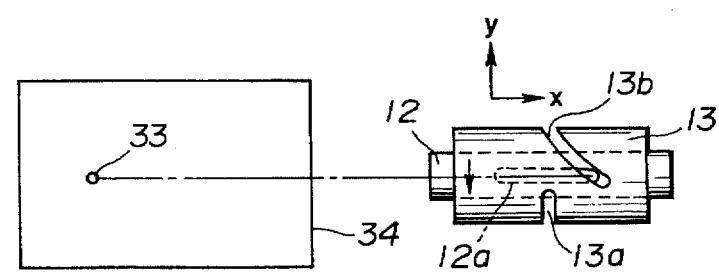
Figure 11E:
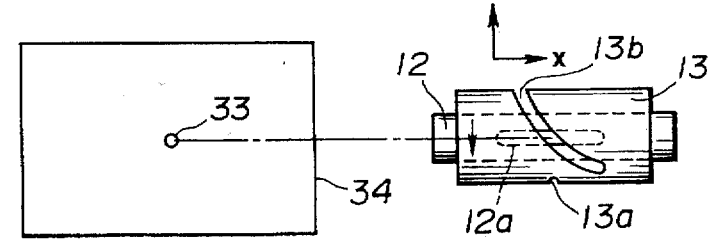
Figure 11F:
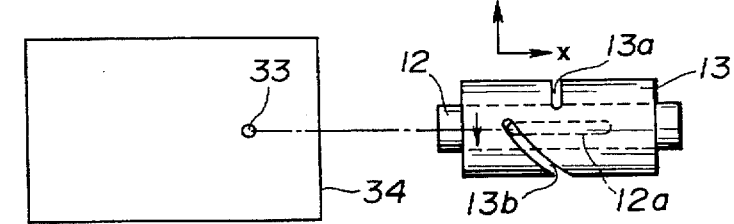

FIG. 11A shows the initial state of the camera 24. FIGS. 11B and 11C show the state in which the roll mask 12 is rotated. FIGS. 11D through 11F show the state in which the roll mask 13 is rotated.

With the motor 17 rotating in reverse to allow the roll mask 12 to rotate, the roll mask 12 rotates in the direction of the arrow b in FIG. 11A.

The opening where the slit 12a of the roll mask 12 and the slit 13a of the roll mask 13 meet moves from one state in FIG. 11A to another in FIG. 11B as the roll mask 12 rotates. As the roll mask 12 rotates further, the slit 12a once hides behind from view, and then appears back as in the state shown in FIG. 11C. In the meantime, the direction of light projection moves accordingly.

Namely, the opening where both slits 12a, 13a meet moves up and down vertically, and the angle with respect to the principal point of the projection lens 2 varies along the Y axis of the camera. While being projected, light thus scans along the Y axis (in parallel with the short edge of the photographing frame).

When the roll mask 12 is rotated as shown in FIGS. 11B and 11C, range measurement is performed with the short edge of the photographing frame scanned.

Referring to the output of the drum roll mask position sensor means 35, CPU 6 controls the timing of flashing of the xenon lamp 10.

With the motor 17 rotating in normal direction to rotate the roll mask 13, in the state shown in FIG. 11A, the roll mask 13 starts rotating in the direction of the arrow a in FIG. 11A.

The slit 13b of the roll mask 13 that was hidden behind in FIG. 11A comes into view, and the ranging light is projected out through the opening where the slit 13b and the slit 12a of the roll mask 12 meet.

As the roll mask 13 rotates further, the opening where the slits 12a, 13b meet shifts from the state in FIG. 11A, sequentially to the succeeding states in FIGS. 11D, 11E and 11F. The direction of light projection shifts accordingly.

Namely, the opening where the slits 13b, 12a meet shifts in the direction of length of the xenon lamp 10. The angle with respect to the principal point of the projection lens 2 varies along the X axis. While being projected, light thus scans along the X axis (in parallel with the long edge of the photographing frame).

When the roll mask 13 rotates as shown in FIGS. 11D through 11F, the long edge of the photographing frame is scanned for range measurement.

CPU 6 controls the timing of the flashing of the xenon lamp 10 according to the output of the drum roll mask position sensor means 35. In this embodiment, no flashing is triggered for the duration during which the camera shifts from the state in FIG. 11A to the state in FIG. 11D. The xenon lamp 10 is flashed for the duration during which camera shifts from the state in FIG. 11D to the state in FIG. 11F, in order to measure the range to the object.

For the duration during which the camera shifts from the state in FIG. 11A to the state in FIG. 11D, the xenon lamp 10 may be flashed to make range measurements repeatedly in the middle portion of the frame, and measurement results may be averaged to obtain range data in the middle portion to improve the accuracy of range data in the middle portion.

The driving method of the roll masks 12, 13 is not limited to the means already described in this embodiment. For example, a differential gear system may be used to switch the driving force of the motor 17. Alternatively, each of the roll masks 12 and 13 may be driven by its own separate actuator.

Figure 8:
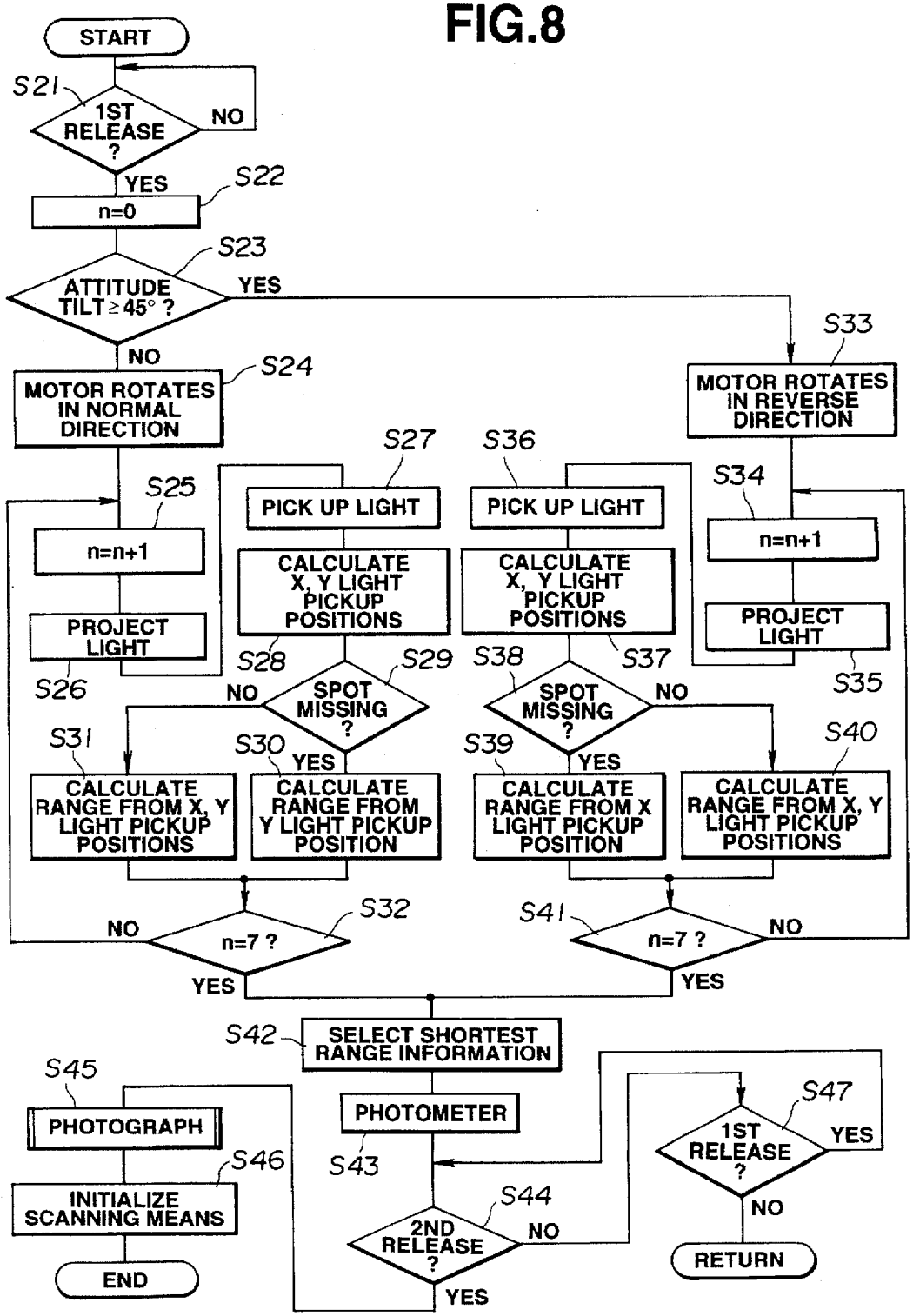
FIG. 8 is a flow diagram showing the operation of the camera of the second embodiment.

The operation of the second embodiment is now discussed referring to the flow diagram in FIG. 8.

The camera 24 is provided with an unshown release button with two-step switching capability. When a first-step pressing is applied to the release button, namely, the pressing of the release switch is detected (step S21), a variable n indicative of the count of range measurements is reset to 0 (step S22). According to the output of the attitude sensor means 7, CPU 6 determines how much degrees the camera 24 is inclined about the optical axis with respect to the horizontal and then determines in which direction to scan for range measurement.

In the second embodiment, a determination is made of whether the inclination of the camera 24 with respect to the horizontal is equal to or greater than 45° (step S23). When the inclination of the camera 24 is found to be less than 45°, scanning is performed in the direction of the long edge of the photographing frame. When the inclination is equal to or greater than 45°, scanning is performed in the direction of the short edge of the photographing frame.

At step S23, the scanning direction is set to be in the direction of the long edge of the photographing frame, the motor 17 is rotated in normal direction to allow the planetary clutch 18 to mesh with the gear series 15 and then the roll mask 13 to rotate (step S24).

Next, n is incremented (step S25). The light emission circuit 11 is driven to allow the xenon lamp 10 to flash, and ranging light is projected to the object (step S26).

The light pickup means 22 receives light reflected off the object (step S27) when ranging light is projected to the object at step S26. The light pickup element 4 then outputs the photoelectrically converted signal.

With the photoelectrically converted signal output by the light pickup element 4 at step S27, AFIC 5 computes the incident light position in terms of the X and Y axes, and the correction means 36 corrects X incident light position (step S28) in response to the output from the drum roll mask position sensor means 35.

Based on the Y incident light position and corrected X incident light position determined at step S28, CPU 6 determines whether or not spot missing takes place (step S29).

When the determination reveals that a spot missing takes place, CPU 6 computes the range to the object based on the Y incident light position determined at step S28, with the base-line length set to S2 (step S30), and then the sequence proceeds to step S32.

On the other hand, when the determination reveals at step S29 that no spot missing takes place, CPU 6 computes the range to the object based on the Y incident light position and the corrected X incident position determined at step S28, with the base-line length set to S1 (step S31).

Next, a determination is made of whether or not the variable n indicative of the count of range measurements equals 7 (step S32). When n=7, the sequence returns to step S25 to start over. The sequence cycles through step S25 through step S32 until the count n reaches n=7.

When the scanning direction is not set to be in the direction of the long edge of the photographing frame, the motor 17 is rotated in reverse (step S33).

Next, n is incremented (step S34). The light emission circuit 11 is driven to allow the xenon lamp 10 to flash, and ranging light is projected to the object (step S35).

The light pickup means 22 receives light reflected off the object (step S36) when ranging light is projected to the object at step S5. The light pickup element 4 then outputs the photoelectrically converted signal.

With the photoelectrically converted signal output by the light pickup element 4 at step S36, AFIC 5 computes the incident light position in terms of the X and Y axes, and the correction means 36 corrects Y incident light position (step S37) in response to the output from the drum roll mask position sensor means 35.

Based on the X incident light position and corrected Y incident light position determined at step S37, CPU 6 determines whether or not spot missing takes place (step S38).

When the determination reveals that a spot missing takes place, CPU 6 computes the range to the object based on the X incident light position determined at step S37, with the base-line length set to S3 (step S39), and then the sequence proceeds to step S41.

On the other hand, when the determination reveals at step S38 that no spot missing takes place, CPU 6 computes the range to the object based on the X incident light position determined at step S37 and the corrected Y incident position determined at step S37, with the base-line length set to S1 (step S40).

Next, a determination is made of whether or not the variable n indicative of the count of range measurements equals 7 (step S41). When n=7, the sequence returns to step S34 to start over. The sequence cycles through step S34 through step S41 until the count n reaches n=7.

When the determination reveals at step S32 or step S41 that the variable n reaches 7, the shortest data is selected from among seven range measurement data obtained either cycling through step S25 through step S32 or cycling through step S34 through S41 (step S42).

The unshown photometering means measures light brightness level of the object and feeds the measured brightness level data to CPU 6, which in turn determines an aperture value and opening time of the unshown shutter mechanism for the photographing lens 8 (step S43) that match the measured light brightness level of the object.

Next, a determination is made of whether the second-step pressing of the release button has performed (step S44). When the second-step pressing is not detected, a determination is made of whether the first-step pressing has been performed (step S47). When the first-step pressing is detected, the sequence returns to step S44. When the first-step pressing is not detected, the sequence returns to step S21.

When the second-step pressing of the release button is detected at step S44, CPU 6 performs focusing to the photographing lens 8 based on the range data selected at step S42. According to the shutter opening time and aperture value determined at step S43, CPU 6 photographs by opening and closing the unshown shutter mechanism (step S45), and then shifts the photographing lens 8 back to its initial position.

In response to the output from unshown position sensor means such as a photoreflector, CPU 6 controls the motor 17 to reset the scanning means, namely, the roll masks 12, 13 provided with slits 12a, 13a, and 13b to their initial positions shown in FIG. 11A (step S46). This concludes the sequence.

The following discussion clarifies why the range to the object is computed with the incident light position signal corrected according to the projection direction of ranging light.

Figure 12:
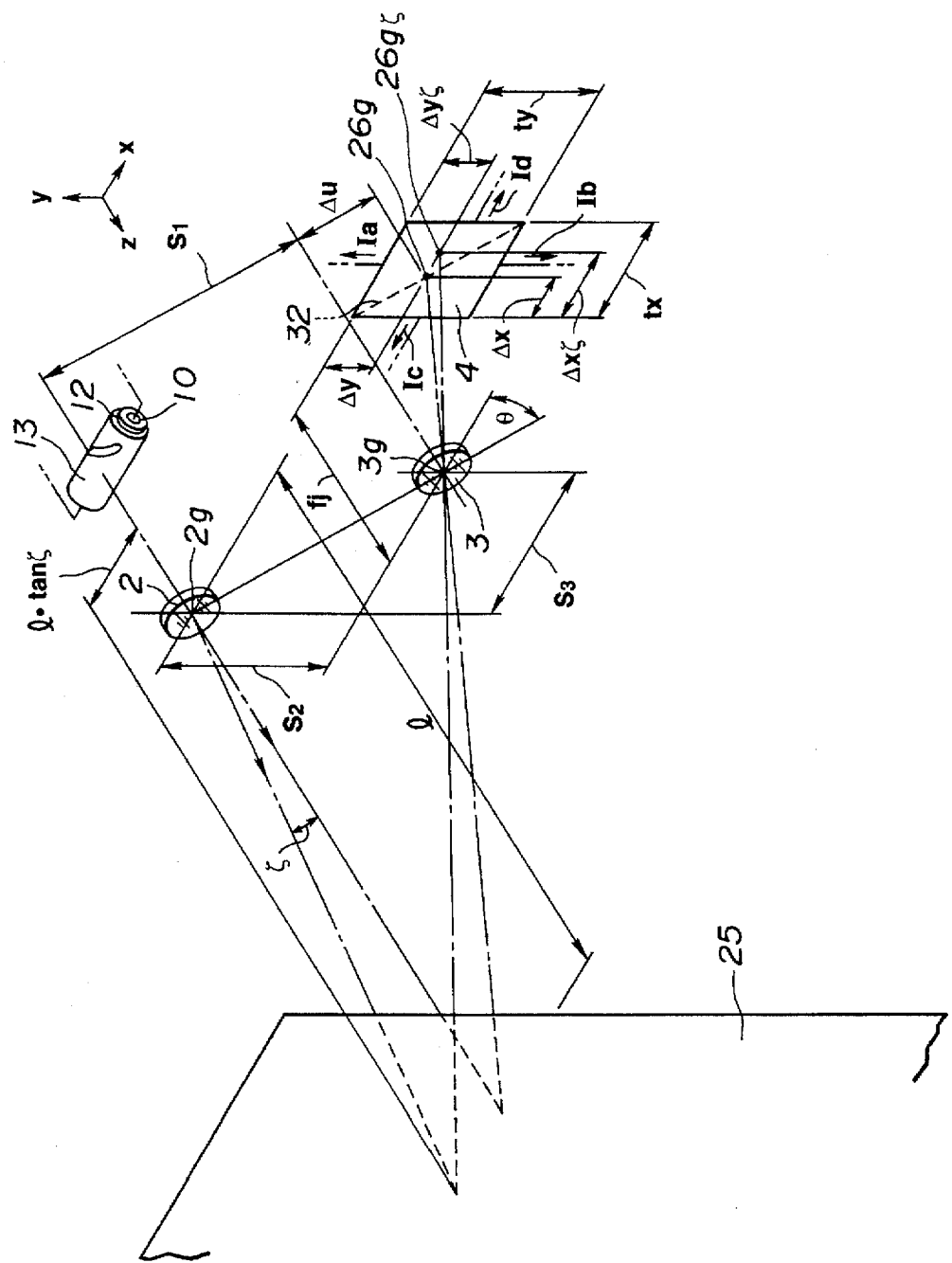
FIG. 12 is a perspective view showing the essential portion of the rangefinding device for use in a camera according to the second embodiment.

FIG. 12 is a perspective view showing the essential portion of the rangefinding device of the camera according to the second embodiment, wherein the projection direction of the ranging light is related with the incident light position reflected back from the object. In FIG. 12, the coordinates are referenced to the vertical directions of the camera, namely, the X, Y and Z axes respectively correspond to the horizontal, vertical and thickness directions of the camera.

Light emitted by the xenon lamp passes through the opening where the slits 12a of the roll mask 12 and the slits 13a, 13b of the roll mask 13 meet, then through the projection lens 2, and is projected to the object. Light reflected off the object 25 enters through the light taking lens 3 and reaches the light pickup element 4 where the incident light image 26 is formed.

S1 is the base-line length that is drawn between the principal point 2g of the projection lens 2 and the principal point 3g of the light taking lens 3. The elevation angle at which one at the principal point 3g of the light taking lens looks up the principal point 2g of the projection lens 2 is θ.

The separation along the X axis between the principal point 2g of the projection lens 2 and the principal point 3g of the light taking lens 3 is the base-line length S3, and the separation along the Y axis is the base-line length S2.

The dimensions of the light pickup element 4 along X and Y axes are respectively tx, ty, and the center of the incident light image 26 on the light pickup element 4 is 26g.

Δu is the length in parallel with the base-line S1 between the center 26g of the incident light image 26 and the point where the light pickup element 4 intersects the optical axis of the light taking lens 3. Distances along the X and Y axes between the intersection and the center 26g are Δx and Δy.

When the ranging light is projected at an angle of $\zeta$ with respect to the optical axis of the projection lens 2 in the XZ plane, the center of the incident light image is $26g\zeta$ on the light pickup element 4. Its position is $\Delta x\zeta$ in the X coordinate and $\Delta y\zeta$ in the Y coordinate.

As clearly understood from FIG. 12, the difference between the case in which the ranging light is projected in the optical axis of the projection lens 2 and the case in which the ranging light is projected at an angle of $\zeta$ with respect to the optical axis of the projection lens 2 is that the incident light position of the reflected light remains unchanged in the Y coordinate but shifts in the X coordinate in the light pickup element 4.

An erroneous range measurement occurs in the second case if the computing and processing for the first case are directly applied to the second case. In the calculation process, a correction should be applied according to the direction of light projection.

Referring to FIG. 12, the correction method is now discussed.

When the ranging light is projected in the optical axis of the projection lens 2 (scanning angle 0°), the range to the object is computed from the X incident light position with the base-line length set to S3 as follows:

$$l = fj \cdot S3 / \Delta x \tag{8}$$

where fj is the focal length of the light taking lens 3.

On the other hand, when the ranging light is projected at an angle of $\zeta$ with respect to the optical axis of the projection lens 2 in the XZ plane (scanning angle $\zeta$), the incident light position changes in the X coordinate, compared with the ranging light projected at a scanning angle of 0°.

$$l \cdot fj = (S3 + l \cdot \tan \zeta) \cdot \Delta x \zeta \tag{9}$$

thus, $$l = fj \cdot S3 / (\Delta x \zeta - fj \cdot \tan \zeta) \tag{10}$$

From equations (8) and (9), Δx and Δxζ are related as follows:

$$\Delta x = \Delta x \zeta - fj \cdot \tan \zeta \tag{11}$$

The X incident light position is corrected according to the direction of projection of ranging light (scanning angle $\zeta$) as expressed in equation (11).

The Y incident light position remains unchanged from the one obtained with the ranging light projected at a scanning angle of 0°, and Δy and Δyζ are equal as follows:

$$\Delta y = \Delta y \zeta \tag{12}$$

The Y incident position needs no correction.

When the ranging light scans, its incident light position is shifted in the direction in parallel with the scanning direction, and the correction for the shifting is made according to equation (11). The incident light position in the direction perpendicular to the scanning direction remains unchanged, and thus no correction is required.

The determination of the presence or absence of spot missing is determined according to whether or not the incident light position signal is on the reference line 32, in the same manner as in the first embodiment. When the incident light position is on the reference line 32, no spot missing is considered to take place. When the incident light position is not on the reference line 32, a spot missing is considered to take place.

In this embodiment, range measurement is made by performing scanning in parallel with the long edge and short edge of the photographing frame. A diversity of scanning directions may be achieved if the shapes of the slits in the roll masks 12, 13 and driving patterns for the roll masks 12, 13 are modified.

FIGS. 13A through 13D show examples of the slits in the roll masks 12, 13 and their scanning directions.

In the figures, the arrows 12s represent the scanning direction when the roll mask 12 is rotated with the roll mask 13 set to be stationary as shown. The arrows 13s represent the scanning direction when the roll mask 13 is rotated with the roll mask 12 set to be stationary as shown.

Figure 13A:
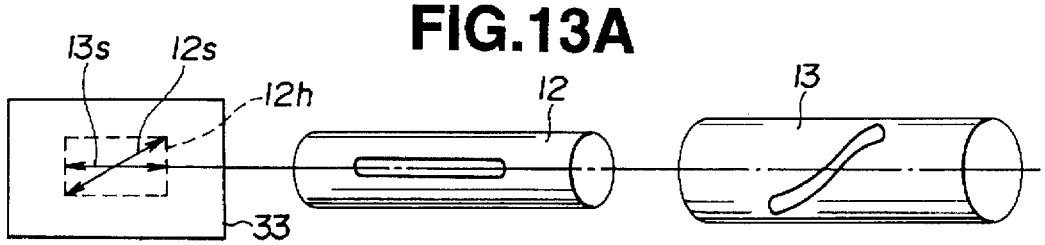
FIGS. 13A through 13D show the shapes of the slits in the roll mask of the second embodiment and corresponding scanning directions.

In FIG. 13A, the roll mask 12 has a longitudinally extending slit. The roll mask 13 has a spirally running slit around its circumference. In the example in FIG. 13A, the ranging light is allowed to scan in parallel with the long edge of the photographing frame or diagonally across the photographing frame by rotating either the roll mask 13 or the roll mask 12.

Figure 13B:
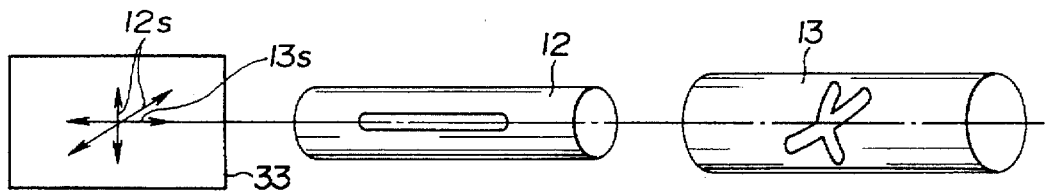

In FIG. 13B, the roll mask 12 has a longitudinally extending slit. The roll mask 13 has, in combination, a spirally running slit and a circumferentially running slit around its circumference. In the example in FIG. 13B, the ranging light is allowed to scan in parallel with the long edge of, short edge of and diagonally across the photographing frame. When the roll mask 13 only is rotated, the ranging light is continuously projected in the center point while it is allowed to scan in parallel with the long edge of the photographing frame.

Figure 13C:
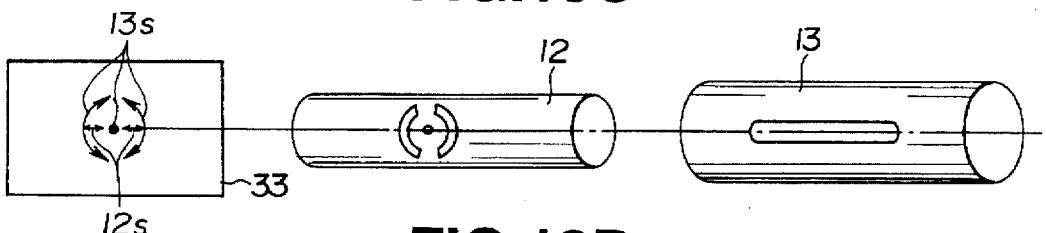

In FIG. 13C, the roll mask 12 has a round hole and a pair of diagonally opposing semicircular slits surrounding the round hole. The roll mask 13 has a longitudinally extending slit. In the example in FIG. 13C, scanning is performed in the center point of the photographing frame, in parallel with the long edge of the photographing frame, and in semicircular patterns centered on the photographing frame.

Figure 13D:
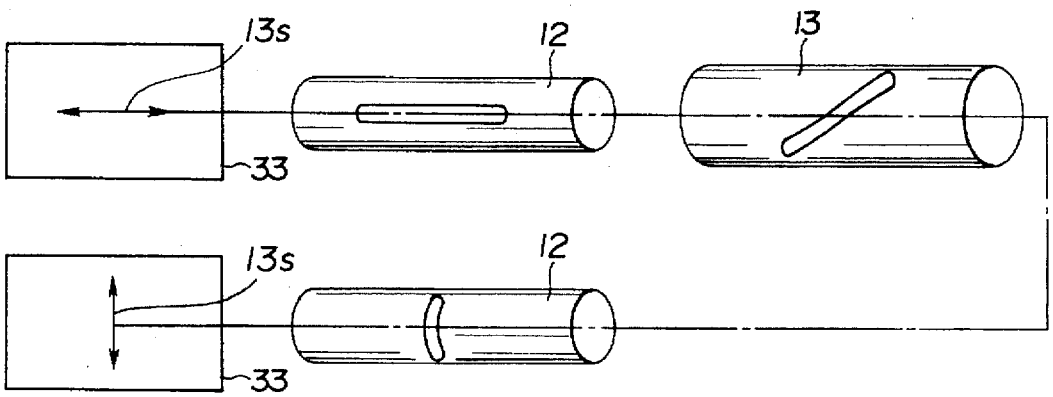

In FIG. 13D, the roll mask 12 has a longitudinally extending slit on its front portion and a circumferentially running around its circumference on its back portion. The roll mask 13 has a spirally running slit around its circumference. In the example in FIG. 13D, since the roll mask 12 has two different slits, one on its front and the other on its back, the roll mask 12 is switched for the front and back slits. The rotation of the roll mask 13 only allows scanning to be performed both in parallel with the long and short edge of the photographing frame.

In the above explanation, one of the roll masks 12, 13 is rotated, the other one is set to be stationary. Alternatively, in FIG. 13A, for example, the roll mask 12 may be rotated in a stepwise manner while allowing the roll mask 13 to be rotated. Then, the area enclosed by the dotted line 12h is entirely scanned, namely, two-dimensional range measurement is made. By allowing two roll masks 12, 13 to rotate independently, a two-dimensional range measurement area is provided.

In this embodiment, the two roll masks having slits are rotated to scan the ranging light. Alternatively, two planar plates having slits may be relatively moved to scan the ranging light.

In this embodiment, the roll masks have elongated slits. Alternatively, they may have a plurality of perforations instead of continuous slits.

The method of switching the scanning direction has been discussed. Since this embodiment has the roll masks as the scanning means, it varies imaging distance of ranging light.

Namely, the outer roll mask may be one having an elliptic cross-section perpendicular to its axis of rotation, or one having other cross-sectional shape in which radius to its axis of rotation varies with an angle of rotation; or the axis of rotation of the drum roll mask is offset from its center axis. When such a roll mask is rotated, the distance between the principal point of the projection lens 2 and the opening through which light is projected from the xenon lamp 10 varies, causing the imaging distance of the ranging light to vary.

By allowing the imaging distance of the ranging light to vary within the measurement range of the rangefinding device, the rangefinding device focuses sharply the ranging light onto the object wherever it is situated. The ranging information thus obtained may be used to enhance the accuracy of range data.

Whether the ranging light is sharply focused on the object or not is determined by sensing the amount of light received by the light pickup element and judging the focusing of the ranging light by the maximum amount of light. Alternatively, since the focal length of the projection lens 2 is known, the focusing may be judged by the distance between the principal point of the projection lens 2 and the opening of the roll mask and by the object ranging information.

In the example of the combination of roll masks in FIG. 13B, the roll mask 12 is positioned inside the roll mask 13, and the roll mask 13 may be rotated about its axis of rotation that is offset from its center axis. The ranging light projected through the single center point of the photographing frame is focused from the shortest distance to the farthest distance of the rangefinding device.

The accuracy of range measurement will be heightened even more if the light pickup element 4 is moved in the direction of the optical axis of the light taking lens 3 so that the incident light image positioned at the imaging distance of the ranging light is accurately formed on the light pickup element 4. In this case, the edge of the slit in the outer roll mask is preferably aligned with the base-line length direction.

In this embodiment, the shortest one is unconditionally selected from among a plurality of pieces of range information. Range information that suffers spot missing may be rejected and spot-missing-free range information only may be accepted to enhance the range measurement accuracy.

Furthermore, in this embodiment, the projection direction of the ranging light is detected to correct the incident light position and the range to the object is then computed. As already described, the incident light position in the direction perpendicular to the scanning direction remains free from the effect of scanning. If the effect of spot missing is not of primary concern, the range to the object may be computed by only the incident light position in the direction perpendicular to the scanning direction, without the need for the projection direction sensing means and correction means provided in this embodiment.

The projection direction may be computed from the incident light position in the direction in parallel with the scanning direction, and this result may be used as projection direction sensing means. In this case, the position of projected and incident light is not limited to the diagonal direction. Any direction is acceptable as long as it is different from the scanning direction. This is because if both the scanning direction and the direction of the base-line length happen to agree, the base-line length in the direction perpendicular to the scanning direction is 0, and the range to the object cannot be computed.

In this embodiment, the range to the object is computed by correcting the incident light position of the ranging light reflected off the object according to the scanning angle. It is perfectly acceptable that correction values corresponding to each scanning angle may be beforehand stored in memory means.

In this embodiment, the ranging light scans in the X coordinate when the camera is horizontally oriented, and scans in the Y coordinate when the camera is vertically oriented. This is because keeping the scanning direction horizontal prevents the blank area effect that is likely to take place, for example, in photographing two persons standing side by side.

As described above, according to the second embodiment, a simple arrangement allows the scanning direction to be properly switched so that range measurement is always properly performed within a desired range regardless of whether the camera is orientated horizontally or vertically. The blank area effect is thus effectively prevented. Furthermore, since the range to the object is computed with the proper direction of base-line length selected depending on the presence or absence of spot missing and the camera orientation or attitude, an accurate range measurement is achieved with no possibility of erroneous measurement.

Furthermore, this embodiment offers an accurate range measurement even without detecting the projection direction of the ranging light, as already described.

Figure 14:
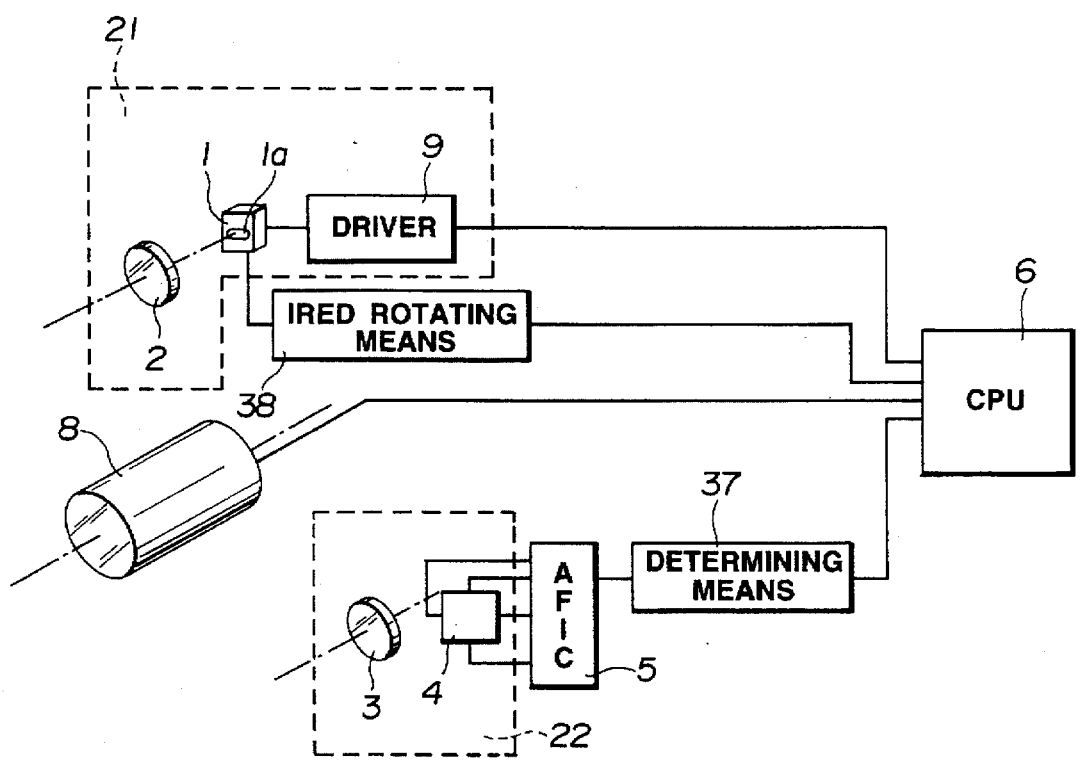
FIG. 14 is a block diagram showing the construction of the rangefinding device for use in a camera according to a third embodiment of the present invention.

FIGS. 14 through 16D show the third embodiment of the present invention. FIG. 14 is a block diagram showing the construction of the rangefinding device of the camera according to the third embodiment of the present invention. In the discussion of the third embodiment, the explanation of those components equivalent to those with reference to the second embodiment is omitted and only the difference from the second embodiment is discussed.

As shown, the rangefinding device of the camera is provided with an infrared emitting diode (IRED) 1 as a light source that projects a ranging light beam to an object. The emission of IRED 1 is designed to be controlled by the driver 9.

IRED 1 has an elongated emitter 1a. The light emitted by IRED 1 is collected by the projection lens 2, which in turn projects the light as the ranging light to the object. IRED 1, projection lens 2, and driver 9 constitute the projection means 21.

IRED rotary means 38 allows IRED 1 to rotate about the optical axis of the projection lens 2. This arrangement projects, to the object, an elongated light pattern along the long edge (X coordinate) of the photographing frame and an elongated light pattern along the short edge (Y coordinate of the photographing frame.

Light reflected off the object, after passing through the light taking lens 3, forms an image on the light pickup element 4. The light taking lens 3 and the light pickup element 4 constitute light pickup means 22.

The light projection means 21 and the light pickup means 22 are positioned diagonally oppositely across the photographing frame with the base-line length S1 spacing therebetween, as in the first and second embodiments.

The light pickup element 4 is a photoelectric converter element for two-dimensionally sensing the incident light position reflected off the object as it is stricken by the ranging light. The light pickup element 4 is constructed of a semiconductor light position sensor element for two-dimensional position sensing. The light pickup element 4 is mounted to sense an incident light position with respect to the horizontal direction (X axis) and vertical direction (Y axis) of the camera 24 and to output a photoelectrically converted signal in response to the incident light position.

The output of the light pickup element 4 is input to the auto focusing integrated circuit (AFIC) 5, which in turn computes the incident light position in terms of horizontal direction (X axis) and vertical direction (Y axis) of the camera in response to the output from the light pickup element 4. AFIC 5 feeds its incident light position signal to determining means 37.

The determining means 37 selects from the output of AFIC 5 an incident light signal that is free of spot missing and sends it to CPU 6.

CPU 6 is the computing and control circuit constructed of a single-chip microcomputer that controls the entire operational sequence of the camera. In response to the incident light signal selected by the determining means 37, CPU 6 computes the range to the object, and performs focusing of the photographing lens 8 based on the calculation result.

In the photographing frame of the camera 24, its horizontal direction, namely its long edge agrees with the X axis, and its vertical direction, namely, its short edge agrees with the Y axis.

Figure 15:
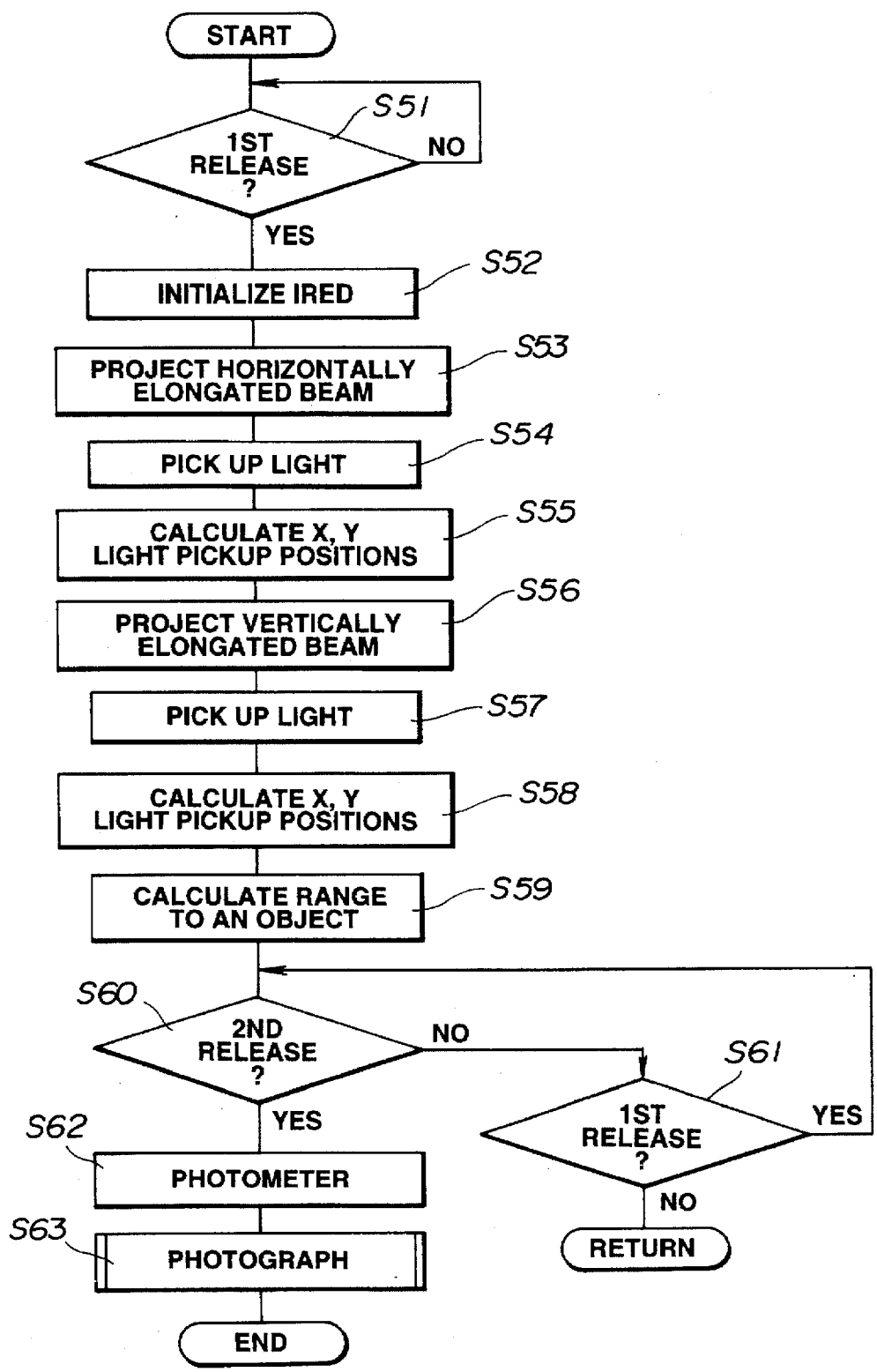
FIG. 15 is a flow diagram showing the operation of the camera of the third embodiment.

Referring to FIG. 15, the third embodiment is now discussed.

The camera 24 is provided with the unshown release button with the two-step switching capability. When a first-step pressing is detected (step S51), the IRED rotary means 38 initializes IRED 1 to its horizontally elongated position (step S52). With IRED 1 at its horizontally elongated position, the driver 9 is driven to allow IRED 1 to emit to project the ranging light to the object (step S53).

With IRED 1 at its initial position, the longitudinal direction of the emitter 1a agrees with the X axis of the camera. The ranging light projected at step S53 forms an X-axis elongated pattern (horizontally elongated pattern), as an image of the ranging light, on the object.

As the ranging light is projected at step S53, the object reflects the light back. The light pickup element 4 receives the reflected light (step S54).

AFIC 5 computes the incident light position in terms of the horizontal direction (X axis) and vertical direction (Y axis) of the camera and outputs the incident light position signal to the determining means 37 (step S55).

The IRED rotary means 38 causes IRED 1 to rotate to align the longitudinal direction of the emitter 1a of IRED 1 with the vertical direction (Y axis) of the camera. The driver 9 is driven to allow IRED 1 to emit to project the ranging light to the object (step S56).

Namely, the ranging light projected at step S56 takes a Y-axis elongated pattern (vertically elongated pattern) on the object.

As the ranging light is projected at step S56, the object reflects the light back. The light pickup element 4 receives the reflected light (step S57).

As the reflected light is received at step S57, AFIC 5 computes the incident light position in terms of the horizontal direction (X axis) and vertical direction (Y axis) of the camera and outputs the incident light position signal to the determining means 37 (step S58).

The determining means 37 selects the incident light position signal free of spot missing from incident light position signals AFIC 5 has output at steps S55, S58, and feeds it to CPU 6. CPU 6 then computes the range from the incident light position to the object (step S59).

A determination is made of whether a second-step pressing of the release button is performed (step S60). When the second-step pressing is not detected, a determination is again made of whether a first-step pressing is performed (step S61). When the first-step pressing is detected, the sequence returns to step S60. When no first-step pressing is detected, the sequence returns to step S51.

When the second-step pressing is detected at step S60, the unshown photometering means measures the light brightness level of the object, and CPU 6 determines an aperture value and opening time of the unshown shutter mechanism for the photographing lens 8 (step S62).

CPU 6 performs focusing to the photographing lens 8 based on the range data computed step S59. According to the shutter opening time and aperture value determined at step S62, CPU 6 photographs by controlling the unshown shutter mechanism (step S63). Upon photographing, CPU 6 initializes the focusing of the photographing to complete the sequence.

Discussed next referring to FIGS. 16A through 16D is the selection method with which determining means 37 selects the incident light position free of the effect of spot missing by projecting horizontally and vertically elongated light patterns.

FIGS. 16A through 16D on their left-hand side show horizontally elongated light patterns 33a and vertical elongated light pattern 33b formed on the object, viewed from the camera side. Shown on their right-hand side are centers 26ga, 26gb of the incident light images formed on the light pickup element 4 corresponding to the patterns 33a, 33b, viewed from the object side. As shown, the coordinates are referenced to the camera 24, viewed from the object. The X axis represents the horizontal direction of the camera, and the Y axis represents the vertical direction of the camera.

Figure 16A:
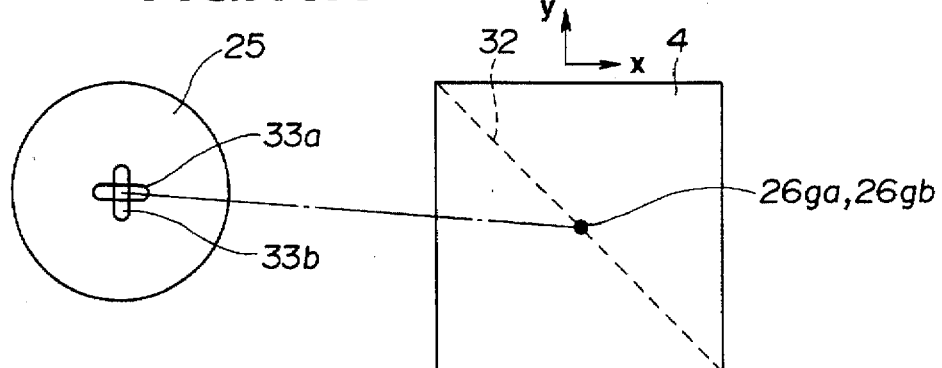
FIG. 16A through 16D show the relationship between the projected light image viewed from the camera side and the center of the image picked up on the light pickup elements viewed from the object side, according to the third embodiment.

In FIG. 16A, the ranging lights in both the horizontally and vertically elongated light patterns are projected onto the object 25 without any spot missing taking place. In comparison with this, FIGS. 16B through 16D show that when a spot missing takes place, the centers of the incident light images fail to align themselves.

It is obvious that an elongated light pattern is likely to cause a spot missing along its longitudinal direction. When a spot missing takes place, the position of the center of the incident light image is thought to be unchanged in the direction of the short edge of the corresponding projected light pattern.

Figure 16B:
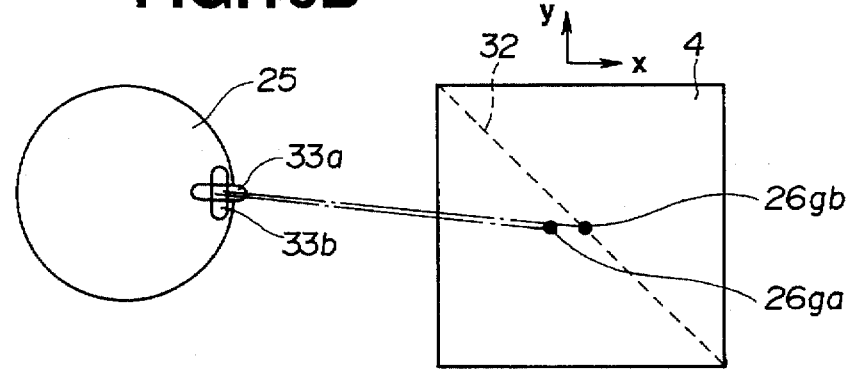

When only the horizontally elongated light pattern suffers spot missing in its corresponding incident light image as shown in FIG. 16B, the image center 26gb corresponding to the vertically elongated light pattern remains free of spot missing. The image center 26gb is free of spot missing in both X and Y coordinates. The image center 26ga is also free of spot missing in the Y coordinate.

Figure 16C:
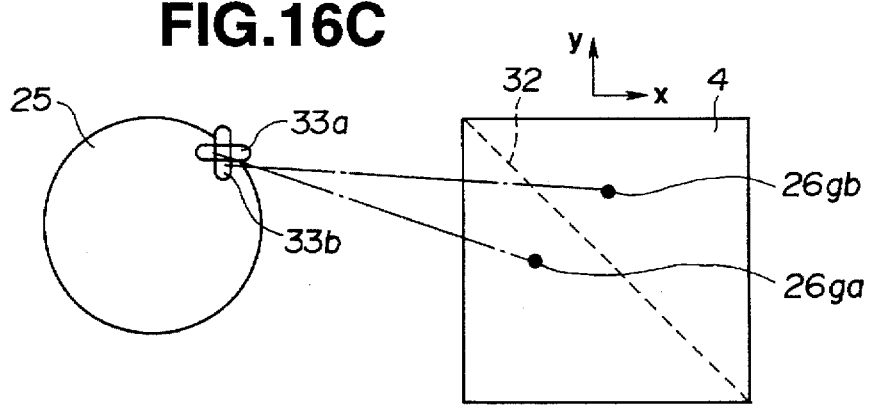
Figure 16D:
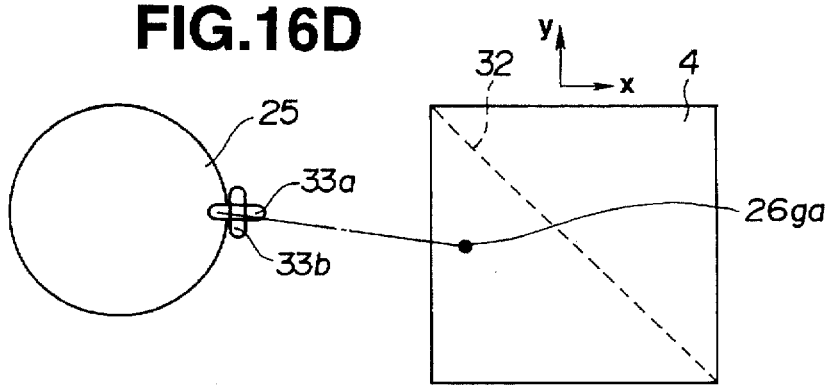

In FIG. 16C, both the horizontally and vertically elongated light patterns 33a, 33b suffer spot missing. Although both incident light images 26ga, 26gb are not on the reference line 32, it is thought that the image center 26ga remains unchanged in the Y coordinate and that the image center 26gb remains unchanged in the X coordinate.

In FIG. 16D, the ranging light in the vertically elongated light pattern fails to strike the object. In this case, no incident light position signal is obtained. When the ranging light in its horizontally elongated pattern is projected, however, the position of the image center in the Y coordinate is used for the incident light position signal as it is free of the effect of spot missing.

When a spot missing takes place, the position of the image center in the direction of the short edge of the corresponding light pattern is used as the incident light position as free of the effect of spot missing.

Whether or not spot missing takes place is determined by checking that the incident light image center is on the reference line 32, as already described with reference to the first embodiment.

According to the above principle, the determining means 37 selects an incident light position signal free of the effect of spot missing.

When both horizontally and vertically elongated light pattern projections are free of spot missing, the range to the object is computed from two sets of incident light position signals derived either during the horizontally elongated light pattern projection or vertically elongated light pattern projection, using S1 as the base-line length.

When either horizontally elongated light pattern projection or vertically elongated light pattern projection suffers spot missing, the range to the object is computed from the incident light position signal, in the X and Y coordinates, of the light pattern projection free of spot missing, using S1 as the base-line length.

When both horizontally and vertically elongated light pattern projections suffer spot missing, the range to the object is computed from the incident light position signal in X coordinate during the vertically elongated light pattern projection and the incident light position in Y coordinate during the horizontally elongated light pattern projection.

When either horizontally elongated light pattern projection or vertically elongated light pattern projection is not projected at all, the range to the object is computed from the incident light position signal in the direction of the short edge of the pattern that is successfully projected.

Namely, if only the vertically elongated light pattern is successfully projected, the range to the object is computed from the incident light position signal in X coordinate during the vertically elongated light pattern projection, using S3 as the base-line length. If only the horizontally elongated light pattern is successfully projected, the range to the object is computed from the incident light position signal in Y coordinate during the horizontally elongated light pattern projection, using S2 as the base-line length.

The definition of S1, S2 and S3 remains unchanged from that in the first and second embodiments. The method of calculation of the range to the object remains the same as the first embodiment.

In this embodiment, when both horizontally and vertically elongated light pattern projections are free of spot missing, either the horizontally elongated light pattern projection or the vertically elongated light pattern projection is used to compute the range to the object. Alternatively, however, the range to the object may be computed from the incident light position signals during both the horizontally and vertically elongated light pattern projections. The resulting two pieces of range information may be averaged to increase rangefinding reliability.

In this embodiment, the vertically elongated light pattern is projected even if the horizontally elongated light pattern projection is free of spot missing. Alternatively, the range to the object is computed based on the incident light position signal obtained during the horizontally elongated light pattern projection, with the vertically elongated light pattern projection skipped, in order to speed up rangefinding procedure.

This embodiment specifies no rule in the order of projections of the horizontally and vertically elongated light patterns. Alternatively, attitude sensor means may be additionally provided to sense the orientation or attitude of the camera. When the attitude sensor means determines that the camera is horizontally oriented, the vertically elongated light pattern is projected first. When the camera is found to be vertically oriented, the horizontally elongated light pattern is projected first. Such a projection order setting lowers the possibility of spot missing at the first projection and speeds up rangefinding procedure.

Spot missing is less likely to take place if a horizontally oriented camera projects first the vertically elongated light pattern and if a vertically oriented camera projects first the horizontally elongated light pattern. This is because the above-mentioned direction of the projected light pattern that suffers less spot missing is aligned with the direction of the camera orientation, described in the first embodiment, which suffers more spot missing.

According to the third embodiment, the same projection means is used to project both the horizontally and vertically elongated light pattern. Without a plurality of light pickup means, the rangefinding device of the camera permits an accurate range measurement with no possibility of erroneous measurement.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A rangefinding device for use in a camera comprising:

light projection means for projecting a light beam to an object;

light pickup means disposed diagonally opposite from said light projection means across a photographing frame, for sensing an incident position of light reflected back from the object and for outputting incident light position information, said light pickup means comprising two-dimensional position sensor means;

computing means for computing a range to the object based on an output of said light pickup means; and attitude sensor means for sensing orientation of the camera, whereby said computing means computes, in response to an output of the said attitude sensor means, a range to the object, based on the incident light position information output Of said light pickup means, at least in one of substantially vertical and substantially horizontal directions of the photographing frame.

2. A rangefinding device for use in a camera comprising:

light projection means for projecting a light beam to an object;

light pickup means disposed diagonally opposite from said light projection means across a photographing frame, for sensing an incident position of light reflected back from the object and for outputting incident light position information, said light pickup means comprising two-dimensional position sensor means;

computing means for computing a range to the object based on an output of said light pickup means;

attitude sensor means for sensing orientation of the camera; and determining means for determining whether or not a light beam projected by said light projection means substantially fully strikes the object, based on the output of said light pickup means, whereby said computing means computes the range to the object from the incident light position information output of said light pickup means in either a substantially vertical direction or a substantially horizontal direction of the photographing fame, in response to an output of said attitude sensor means, when said determining means determines that said light beam only partially strikes the object, and said computing means computes the range to the object from the incident light position information output of said light pickup means in both the substantially vertical direction and the substantially horizontal direction of the photographing frame, when said determining means determines that said light beam substantially fully strikes the object.

3. A rangefinding device for use in a camera comprising:

light projection means for projecting a light beam to an object;

light pickup means disposed diagonally opposite from said light projection means across a photographing frame, for sensing an incident position of light reflected back from the object and for outputting incident light position information, said light pickup means comprising two-dimensional position sensor means for sensing light in two directions transverse to one another;

computing means for computing a range to the object based on the output of said light pickup means; and determining means for determining whether or not the light beam projected by said light projection means substantially fully strikes the object, based on an output of said light pickup means.

4. The rangefinding device for use in a camera according to claim 3 further comprising warning means for alerting a photographer when said determining means determines that said light beam only partially strikes the object.

5. The rangefinding device for use in a camera according to claim 3 further comprising locking means for disabling photographing when said determining means determines that the light beam totally fails to strike the object.

6. A rangefinding device for use in a camera comprising:

light projection means for projecting a light beam to an object;

light pickup means disposed diagonally opposite from said light projection means across a photographing frame, for sensing an incident position of light reflected back from the object and for outputting incident light position information, said light pickup means comprising two-dimensional position sensor means; and wherein said computing means sets an aperture of a photographing lens to a smaller setting for photographing when said determining means determines that said light beam only partially strikes the object.

7. A rangefinding device for use in a camera comprising:

light projection means for projecting a light beam to an object;

scanning means for allowing the light beam to scan the object by changing the direction of projection of the light beam from said light projection means;

light pickup means spaced apart from said light projection means by a base-line length, for sensing an incident position of light reflected back from the object and for outputting incident light position information, said light pickup means comprising two-dimensional position sensor means;

computing means for computing a range to the object based on the output of said light pickup means;

attitude sensor means for sensing orientation of the camera; and control means for switching scanning directions of said scanning means in response to an output of said attitude sensor means, whereby the directions of said scanning means are at least two different directions.

8. The rangefinding device for use in a camera according to claim 7, wherein the scanning directions of said scanning means are two mutually perpendicular directions, not lying in the direction of the base-line length, and said control means switches between the two scanning directions of said scanning means in response to the output of said attitude sensor means;

the two directions of incident light position sensing by said light pickup means agreeing with the two scanning directions of said scanning means, and said computing means computing a range to the object, based on incident light position information in one direction that is perpendicular to the scanning direction, from among the incident light position information outputted by said light pickup means.

9. A rangefinding device for use in a camera comprising:

light projection means for projecting a light beam to an object;

scanning means for allowing the light beamto scan the object by changing a direction of projection of the light beam from said light projection means;

light pickup means disposed diagonally opposite from said light projection means across a photographing frame for sensing an incident position of light reflected back from the object and for outputting incident light position information, said light pickup means comprising two-dimensional position sensor means;

computing means for computing the range to the object based on the output of said light pickup means;

attitude sensor means for sensing the orientation of the camera; and control means for switching between two scanning directions of said scanning means in response to an output of said attitude sensor means, whereby the scanning directions of said scanning means are first and second directions rspectively along a short edge and a long edge of the photographing frame, and scanning is performed along the long edge of the photographing frame when the camera is horizontally oriented, and scanning is performed along the short edge of the photographing frae when the camera is vertically oriented.

10. A rangefinding device for use in a camera comprising:

light projection means for projecting a light beam to an object;

scanning means for allowing the light beamto scan the object by changing a direction of projection of the light beam from said light projection means;

projection direction sensor means for sensing the direction of projection;

light pickup means spaced apart from said light projection means by a base-line length, for picking up light reflected off the object as the light beam is projected by said light projection means and or sensing an incident position of incident light;

correction means for correcting an incident light position information output of said light pickup means in response to an output of said projection direction sensor means;

computing means for computing a range to the object in response to an output of said correction means;

attitude sensor means for sensing an orientation of the camera; and control means for switching scanning direction of said scanning means in response to an output of said attitude sensor means.

11. A rangefinding device for use in a camera comprising:

light projection means for projecting a light beam to an object;

scanning means for allowing the light beamto scan the object by changing a direction of projection of the light beam from said light projection means;

light pickup means disposed diagonally opposite from said light projection means across a photographing frame, for sensing an incident position of light reflected back from the object and for outputting incident light position information in a substantially vertical direction and a substantially horizontal direction of a photographing frame, said light pickup means comprising two-dimensional position sensor means;

correction means for correcting an incident light position information output of said light pickup means according to a projection direction of the light beam;

computing means for computing a range to the object in response to an output of said light pickup means;

attitude sensor means for sensing orientation of the camera;

determining means for determining whether or not the light beam of said light projection means substantially fully strikes the object; and control means for switching scanning direction of said scanning means in response to an output of said attitude sensor means, whereby said computing means computes the range to the object from an incident light position information output of said light pickup means in either the substantially vertical direction or the substantially horizontal direction of the photographing frame, in response to an output of said attitude sensor means, when said determining means determines that said light beam only partially strikes the object, and said computing means computes the range to the object from the incident light position information output of said light pickup means in both the substantially vertical direction and the substantially horizontal direction of the photographing frame, when said determining mean determines that said light beam substantially fully strikes the object.

12. A rangefinding device for use in a camera comprising:

light projection means for projecting a light beam to an object; and scanning means for changing a direction of projection of the light beam of said light projection means, whereby said scanning means comprises a first drum mask having a window and a second drummask disposed inside or outside of the first drum mask, said second drum mask having a window, and the projection direction of thelight beam is switched by moving said two drum masks relative to one another.

13. The rangefinding device for use in a camera according to claim 12, wherein said scanning means switches scanning direction by selectively driving said two drum masks.

14. The rangefinding device for use in a camera according to claim 12, wherein said first drum mask has two or more windows, and said second drum mask has a single window, and the scanning direction is switched by selectively moving said first and second drum masks.

15. The rangefinding device for use in a camera according to claim 12, wherein said second drum mask is disposed outside said first drum mask, the axis of rotation of said second drum mask is offset from the center axis of said first drum mask, and the projection direction of the light beam is switched by rotating said second drum mask.

16. The rangefinding device for use in a camera according to clam 12, said second drum mask, being elliptic in cross section, is disposed outside said first drum mask, and the projection direction of the light beam is switched by rotating said second drum mask.

17. The rangefinding device for use in a camera according to claim 12 or claim 13, wherein planar plates are substituted for said drum masks.

18. A rangefinding device for use in a camera comprising:

light projection means for projecting a single light beam to an object;

light pickup means disposed diagonally opposite from said light projection means across a photographing frame, for sensing two-dimensionally an incident position of light reflected back from the object and for outputting incident light position information, said light pickup means comprising two-dimensional position sensor means for sensing light in two directions transverse to one another; and computing means for computing a range to the object in response to an output of said light pickup means, whereby said light projection means is capable of projecting a light beam to the object in two different, mutually substantially perpendicular directions in a range measurement operation, and said computing means computes the range to the object based on the incident light position information output of said light pickup means at least in one direction selected from the two directions corresponding to two different directions in which the light is reflected off the object.

19. The rangefinding device for use in a camera according to claim 18, wherein said light beam is elongated in its cross section perpendicular to its optical axis.

20. The rangefinding device for use in a camera according to claim 19, wherein the range to the object is computed based on the incident light output along a short side of the elongated light beam.

21. A rangefinding device for use in a camera comprising:

light projection means for projecting a ranging light to an object;

a two-dimensional light position sensor element for picking up ranging light reflected off the object, sensing two-dimensionally an incident position of incident light, and outputting a first signal representing a position along a first direction of the sensor element and a second signal representing a position along a second direction of the sensor element; and an optical system for guiding the ranging light from said light projection means to said two-dimensional light position sensor means in a manner that said first and second signals simultaneously vary on said two-dimensional light position sensor element in response to a variation in a range to the object.

22. A rangefinding device for use in a camera comprising:

single light projection means for projecting a light within a predetermined region within a photographing frame;

light projection position restricting means for allowing the light projected from said light projection means to pass through differently positioned windows, one by one, sequentially;

light pickup means for picking up light reflected off an object when the light is projected to the object by the light projection means;

computing and control means for controlling said light projection position restricting means while allowing said projection means to emit light, and for computing a range to the object with respect to a plurality of points within the photographing frame in response to an output of said light pickup means.

23. The rangefinding device for use in a camera according to claim 22, wherein said light projection means comprises light projection direction switching means for changing a light projection direction by switchably selecting one from among two or more windows.

24. The rangefinding device for use in a camera according to claim 22, wherein said light projection means comprises light projection direction switching means for changing a light projection direction by displacing a position of the window.

25. A method for determining range of an object from a camera, comprising the steps of:

(a) positioning a light generating means and a light pickup means on opposite sides of an image frame so that a line extending through centers of said light generating means and said light pickup extends diagonally through the image frame;

(b) operating the light generating means to direct ranging light therefrom toward an object and arranged in mutually perpendicular directions;

(c) focusing ranging light reflected from said object upon said light pickup (d) determining an incident position of the light focused on said light pickup in mutually perpendicular directions;

(e) determining an orientation of the photographing frame; and (f) determining a range to the object based on an output of the light pickup means representing one of the mutually perpendicular directions responsive to orientation of the photographing frame.

26. The method of claim 25 wherein step (d) further comprises:

(g) determining if the focused reflected light impinges upon a predetermined area on said light pickup and utilizing that position information which impinges upon the predetermined area.

27. The method of claim 26 wherein step (b) further comprises:

(h) changing an angular direction of light from the light source directed toward the object; and step (f) further comprises:

(i) determining the range based on ranging light reflected from the object which impinges on said predetermined area.

* * * * *